United States Patent
Lizotte et al.

(10) Patent No.: US 6,804,269 B2
(45) Date of Patent: *Oct. 12, 2004

(54) LASER BEAM DELIVERY SYSTEM WITH TREPANNING MODULE

(75) Inventors: Todd E. Lizotte, Manchester, NH (US); Orest Ohar, Hooksett, NH (US)

(73) Assignee: Hitachi Via Mechanics, Ltd., Ebina (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/162,944

(22) Filed: Jun. 4, 2002

(65) Prior Publication Data

US 2002/0196534 A1 Dec. 26, 2002

Related U.S. Application Data

(60) Provisional application No. 60/323,005, filed on Sep. 18, 2001, and provisional application No. 60/299,205, filed on Jun. 19, 2001.

(51) Int. Cl.[7] .............................. H01S 3/10; H01S 3/08
(52) U.S. Cl. ............................ 372/9; 372/100; 372/101
(58) Field of Search ............................ 372/9, 100, 101

(56) References Cited

U.S. PATENT DOCUMENTS

| | | | |
|---|---|---|---|
| 5,010,232 A | | 4/1991 | Arai et al. ............... 219/121.7 |
| 5,627,627 A | * | 5/1997 | Suzuki ...................... 355/68 |
| 5,729,353 A | * | 3/1998 | Sawayama et al. ......... 358/300 |
| 5,767,962 A | * | 6/1998 | Suzuki et al. ............. 356/237.2 |
| 6,268,904 B1 | * | 7/2001 | Mori et al. .................. 355/53 |
| 6,392,742 B1 | * | 5/2002 | Tsuji ......................... 355/67 |
| 6,407,363 B2 | | 6/2002 | Dunsky et al. ......... 219/121.71 |
| 6,433,301 B1 | | 8/2002 | Dunsky et al. ......... 219/121.67 |
| 6,531,677 B2 | | 3/2003 | Arai et al. ............. 219/121.71 |
| 6,610,960 B2 | | 8/2003 | De Steur et al. ........ 219/121.71 |
| 6,653,593 B2 | * | 11/2003 | Lizotte et al. ........... 219/121.7 |
| 6,696,008 B2 | | 2/2004 | Brandinger ................ 264/400 |
| 2003/0038937 A1 | * | 2/2003 | Sato .......................... 356/400 |
| 2003/0213767 A1 | | 11/2003 | Dunsky et al. ......... 219/121.75 |

* cited by examiner

*Primary Examiner*—Don Wong
*Assistant Examiner*—James Menefee
(74) *Attorney, Agent, or Firm*—Davis & Bujold, P.L.L.C.

(57) ABSTRACT

A laser beam delivery system for supplying a laser beam to a computer generated hologram which shapes and divides the supplied laser beam into a plurality of pseudo flat top laser beams. The plurality of pseudo flat top laser beams are then passed through collimated optics which alter the beams so that the beams are conveyed along the optical axis in a parallel manner. The plurality of collimated laser beams then passes through a converging mechanism which facilitates converging of the plurality of separated collimated laser beams through a clear aperture of a mirror of a first repeat positioning device so that all of the light is received by the repeat positioning device and appropriately reflected thereby to a second mirror of a second repeat positioning device and then to a rear surface of an F-Theta lens. The F-Theta lens focuses the plurality of separated collimated laser beams at the object to be processed. The converging mechanism facilitates converging of all of the supplied light so that substantially all of the supplied light passes through the clear aperture(s) of the repeat positioning device(s).

20 Claims, 19 Drawing Sheets

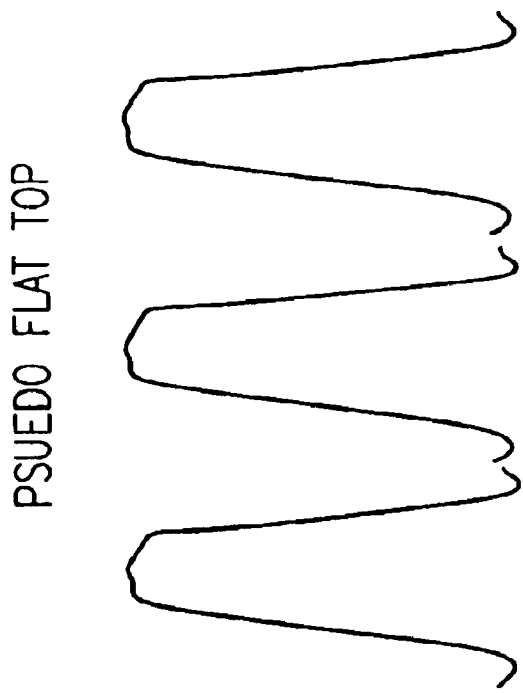
FIG.3B PSUEDO FLAT TOP
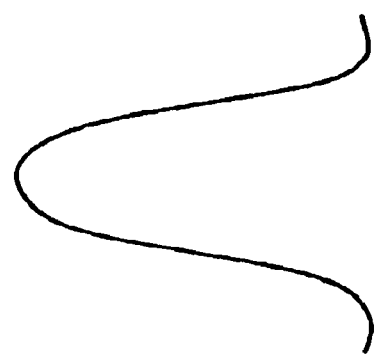
FIG.3A GAUSSIAN

LASER BEAM DELIVERY SYSTEM WITH TREPANNING MODULE This application claims the benefit of Provisional application Ser. Nos. 60/299,205, filed Jan. 19, 2001, and 60/323,005, filed Sep. 18, 2001.

FIELD OF THE INVENTION

The present invention relates to a laser beam delivery system that will split a single beam into a plurality of equally sized and shaped laser beams which will be altered and finally directed at an object to facilitate efficient processing of a desired surface of the object, such as a substrate.

BACKGROUND OF THE INVENTION

While it is currently known in the prior art to split a single laser beam into a plurality of different beams, many of the systems currently available are very cumbersome to operate and do not efficiently process the laser beam once it is split into a plurality of laser beams. In particular, the currently known prior art systems presently available do not facilitate redirecting of the split laser beams efficiently and quickly at a desired surface of an object to be processed and achieve the desired precision of the laser beam delivery system.

Generally, a laser beam is focused or altered, by the inherent optics of the system, to provide either "focal point machining" or "imaging" of the object to be processed. Focal point machining is conventional and well known in the art and generally comprises supplying a laser beam B from a laser L (see FIG. 1) to repeat positioners or galvanometers where the supplied laser beam B is reflected by the mirror, of the repeat positioner or galvanometer M (only one of which is shown for reasons of clarity), to a focusing lens F which, in turn, focuses the supplied beam at an object to be processed O. The objective of focal point machining is to focus and concentrate all of the energy from the laser beam B so that it converges at a desired spot S on the surface of the object to be processed O. It is to be appreciated that the object to be processed O is spaced from the focusing lens F by a distance which is equal to the focal plane FP of the focusing lens F to facilitate converging all of the supplied light at a desired area or spot S on the surface of the object to be processed O and formation of a desired aperture or feature in the object to be processed O.

Imaging is also conventional and well known in the art but, on the other hand, generally comprises a higher finesse and tighter tolerance processing of a desired aperture or feature in the object to be processed O. As with "focal point machining", a laser beam B is supplied from a laser L (see FIG. 2) to a repeat positioner or galvanometer (only one of which is shown for reasons of clarity) where the supplied laser beam B is reflected by the mirror M, of the repeat positioner or galvanometer, to a focusing lens F which, in turn, focuses the supplied beam B at an object to be processed O. The objective of imaging is to image an apertured area of the supplied laser beam on the surface of the object to be processed O. To achieve this, the object to be processed O is spaced from the focusing lens F by a distance which is greater than the focal plane FP of the focusing lens F. Conventional imaging geometric lens equations are utilized to determine and/or calculate the process parameters and to optimize the object to image ratio of the imaging system. As such equations and teaching are well known in the art, a further detail discussion concerning the same is not provided.

SUMMARY OF THE INVENTION

Wherefore, it is an object of the present invention to overcome the above mentioned shortcomings and drawbacks associated with the prior art.

Another object of the present invention is to develop a laser beam delivery system that will separate a single laser beam into a plurality of equally sized and shaped laser beams, preferably two, three or more separate laser beams, and each one of these equally sized and shaped laser beams is formed to have a substantially or pseudo flat top profile or customized shape optimized for processing.

A further object of the present invention is to collimate each one of the separate equally sized and shaped laser beams, once split by the laser delivery system, and supply each of the collimated and split laser beams to the object to be processed.

Yet another object of the present invention is to provide an illumination prism, along the optical axis of the laser beam delivery system, to facilitate converging of the three separate laser beams, in an overlapped or a partially overlapped manner, to a first mirror of a repeat positioning system, e.g. a galvanometer, so that the three overlapped beams will only be received within and illuminate the clear aperture of the mirror of the repeat positioning system thereby ensuring that all of the supplied laser beam light is reflected by the repeat positioning system, at the object to be processed, to maximize the efficiency of the laser beam delivery system.

A still further object of the present invention is to provide an adjustment mechanism for facilitating movement of the illumination prism, along the optical axis of the laser beam delivery system, to fine tune the degree of convergence or overlap of the separate collimated beams as well as re-expansion and final separation of the three separate collimated beams as the beams enter the F-Theta lens.

Still another object of the present invention is to provide a laser beam delivery system which allows a plurality of separate laser beams, e.g. two, three or more separate laser beams, to process a desired surface of an object to be processed to improve the efficiency of the laser beam delivery system.

Yet another object of the present invention is to provide a trepanning module which facilitates altering of the supplied laser beams so that each laser beam is controlled to spiral either radially inwardly or radially outward in unison with one another.

As is apparent from the following discussion, the term "overlap" as used in this patent application and the appended claims, does not necessarily mean that the laser beams must physically overlap or combine with one another—this term is intended to mean merely that all three beams sufficiently converge with or toward one another by a sufficient amount so as to pass through the clear aperture of the mirror of the first repeat positioner.

The term "object to be processed", as used in this patent application, is intended to cover PC boards, substrates, panels, flex circuits and other computer and electronic components in which small apertures, vias or other holes are to be formed in the object to be processed.

BRIEF DESCRIPTION OF THE DRAWINGS

The invention will now be described, by way of example, with reference to the accompanying drawings in which:

FIG. 3A is a diagrammatic representation showing a wave profile of the emitted initial laser beam;

FIG. 3B is a diagrammatic representation showing a wave profile of the three laser beams, at an image plane, following splitting of the initial laser beam;

DESCRIPTION OF THE PREFERRED EMBODIMENT(S)

Figure 3:
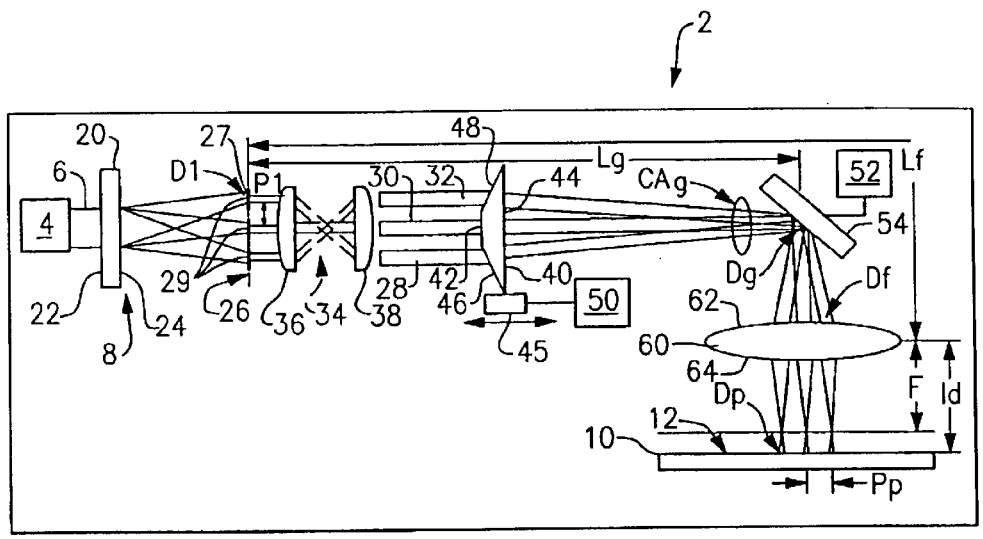
FIG. 3 is a diagrammatic view of a first embodiment of the laser beam delivery system for imagining.

Turning now to FIG. 3, a brief description concerning the basic components of the present invention will first be provided. As can be seen in this embodiment, the laser beam delivery system 2 generally comprises a laser 4 which is arranged to supply the laser beam 6 to a laser beam splitter/shaper/collimator apparatus, generally designated by reference numeral 8, where the emitted laser beam 6 is split into a plurality of equally sized and shaped laser beams, preferably three equally sized and shaped laser beams. Once the laser beam is suitably split into a plurality of equally sized and shaped laser beams, the split, shaped and collimated laser beams are then directed at a top surface 10 of an object to be processed 12, e.g. a substrate.

The laser beam preferably emits ultraviolet light having a wave length of 354.7 nm (3rd harmonic of Nd:YAG). Preferably the laser beam 6 has a beam diameter of about 2.8 mm±10% and a laser beam mode is TEM00 (Gaussian). The laser M2 is preferably <1.3 while the polarization ratio is preferably >100:1. The pulse duration is preferably 10 ns while the pulse energy of the laser beam 6 is about 450 MicroJoules. A variety of other laser beams, such as, 9.3 micron, 9.4 micron, 532 nm, etc., may also be utilized. As the remaining features of the above discussed components of the present invention are conventional and fairly well known in the art, a further detailed description concerning the same is not provided.

Still with reference to FIG. 3, a detailed description concerning the beam splitter/shaper/collimator apparatus 8, according to the present invention, will now be described. As can be seen in this Figure, the laser beam 6 is directed by the laser 4 toward a rear surface of a computer generated hologram 20. The laser beam 6, emitted by the laser 4, generally has a laser beam profile (i.e., gaussian) which is shown in FIG. 3A of the drawings. The emitted laser beam 6 enters a front surface 22 of the computer generated hologram 20 which is designed to split the supplied laser beam 6 into a plurality of separate equally sized and shaped laser beams 28, 30, 32 which each has a substantially flat top profile (FIG. 3B) or specific shape tailored for optimized processing. According to a preferred form, the laser beam 6 will be split into three equally sized and shaped laser beams 28, 30, 32, as shown in FIG. 3 of the drawings. Although three split laser beams 28, 30, 32 are shown in FIG. 3 of the drawings, it is to be appreciated that the computer generated hologram 20 can be designed, according to the specific design requirements, to split the supplied laser beam into fewer or more equally sized and shaped laser beams depending upon the specific application at hand.

As the laser beam 6 travels through the computer generated hologram 20, the supplied laser beam light is altered by the inherent characteristics of the computer generated hologram 20 and then emitted from the rear surface 24 of the computer generated hologram 20 as three equally sized and shaped laser beams 28, 30, 32 toward an image plane 26. The three equally sized and shaped laser beams 28, 30, 32, when the laser beams are located at image plane 26, each has a wave form similar to that shown in FIG. 3B of the drawings, e.g. each one of the three equally sized and shaped laser beams has a pseudo flat top.

The computer generated hologram 20 is designed to separate or spread the initial laser beam 6 into three equally sized and shaped laser beams and change the gaussian profile (see FIG. 3A) of the inputted laser beam 6 into three flat top-like profiles (see FIG. 3B) or some other suitable shape optimized for processing. Preferably the input laser beam is a 2.8 mm±10%, having an M2 greater than 1.3 and gaussian in shape. The computer generated hologram 20 is generally designed to alter the shape of the laser beam to output three separate laser beams each having a diameter of about 1.5 mm, for example.

A conventional shutter 27 is located at he image plane 26 of the laser beam delivery system 2. The shutter 27 comprises a plurality of movable members or doors 29 which, when in an opened position, allow supplied light to pass therethrough and when in a closed position, function as a light trap to block light and prevent supplied light from passing therethrough. According to the first embodiment, three apertures are provided and each aperture has an associated door 29, having opened and closed positions, and the computer generated hologram 20 is designed to direct each one of the three separate laser beams through one of the respective apertures of the shutter 27. By this arrangement, when a door 29 is in an opened position, the computer generated hologram 20 projects light through the aperture so that the supplied light may be thereafter collimated by the collimating optics 34. However, when the associated door 29 is in its closed position, the light from the computer generated hologram 20 is blocked by the door 29 and cannot pass through the aperture. Each one of the doors 29 is electrically coupled to a control device, motor or some conventional device (not shown) for controlling movement of the door 29 from its opened to its closed positions, and vice versa. By adequately controlling the position of the doors 29 of the shutter 27 either: all of the light can be blocked, any single beam of light can be blocked while the two remaining beams of light can be allowed to pass to the shutter 27, any two beams of light can be blocked while the remaining beam of light can be allowed to pass through the shutter 27, or all of the light can be allowed to pass through the shutters 27.

The three equally sized and shaped laser beams 28, 30, 32, after passing through the image plane 26, provided that all three doors 29 are in their opened position, are directed at the collimating optics 34. The collimating optics 34, according to the first embodiment, comprises a pair of closely spaced and opposed convex lenses 36, 38. The collimating optics 34 collimate the three equally sized and shaped laser beams 28, 30, 32 and outputs the collimated laser beams along the optical axis A toward the object to be processed 12. The collimating optics 34 can be, for example, either a refractive or a diffractive member(s). An important feature of the collimating optics 34, however, is that the three separate laser beams are collimated to ensure that only collimated light is supplied along the optical axis A from the collimating optics 34 toward the object to be processed 12.

The three separate and collimated laser beams 28, 30, 32 are emitted from a rear surface of the collimating optics 34 toward an optimizer and pitch compensator optic, i.e., a converging mechanism such as an illumination prism 40. The illumination prism 40 preferably has a pair of opposed planar surfaces 42, 44, which both extend perpendicular to the optical axis A of the laser beam delivery system 2, and a pair of inclined surfaces 46, 48 which each form an acute angle with the optical axis A of the laser beam delivery system 2. Preferably, the acute angle is between 70° and 99°, most preferably about 89.5°. The illumination prism 40 is supported by an adjustment assembly 45 connected to a motorized drive 50, only diagrammatically shown in the drawings, which facilitates conveying the illumination prism 40 axially to and fro along the optical axis A of the laser beam delivery system 2. The motorized drive 50 facilitates moving the illumination prism 40 either toward the collimating optics 34 or toward a repeat positioner 52 to adjust focusing characteristics of the laser beam delivery system 2.

Figure 2:
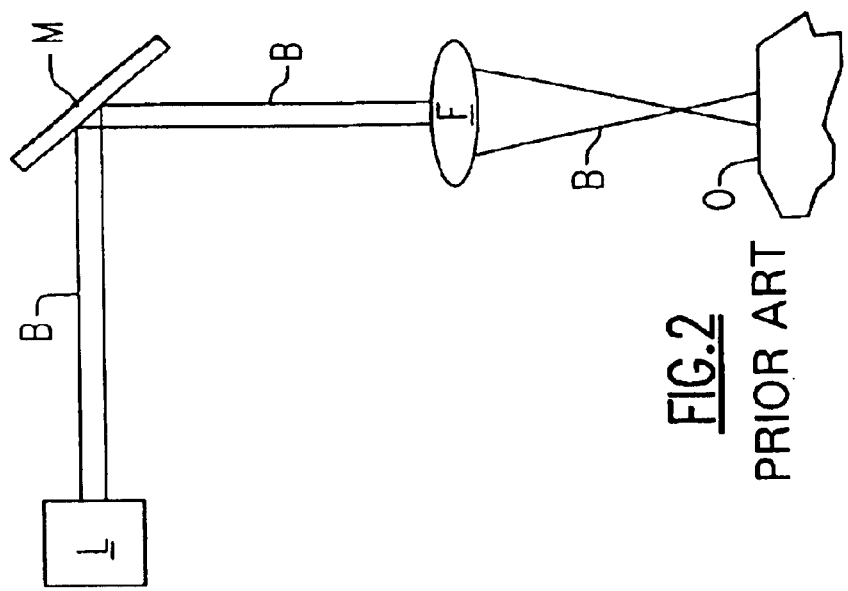
FIG. 2 is a diagrammatic representation showing the prior art technique relating to imaging.
Figure 1:
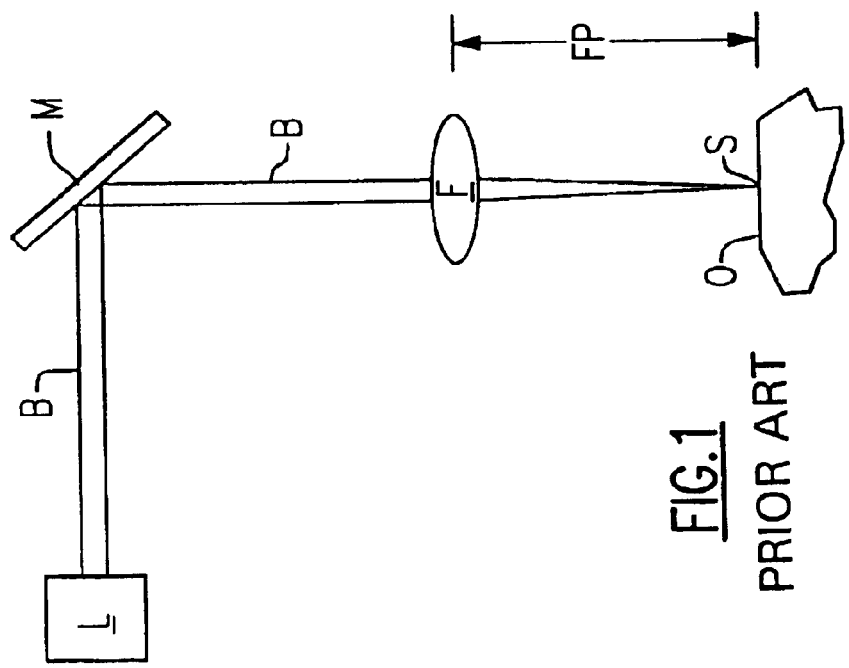
FIG. 1 is a diagrammatic representation showing the prior art technique relating to focal point machining.

The central planar surface 42 of the illumination prism 40, which extends perpendicular to the optical axis A of the laser beam delivery system 2, does not redirect the central beam 30 of the three equally sized and shaped laser beams 28, 30, 32, and that central planar surface 42 allows that light to pass directly therethrough without substantially affecting the shape, angle or path of the central beam 30. Each of the pair of inclined surfaces 46, 48, however, alter and/or redirect one of the two collimated outer beams, i.e., inclined surface 46 redirects collimated beam 28 while inclined surface 48 redirects collimated beam 32 so that both of those two beams at least partially converge toward one another and/or overlap the central beam 30 at a desired optical distance from the illumination prism 40. This redirecting of the two outer beams 28 and 32 over the central beam 30 allows the three equally sized and shaped collimated beams 28, 30, 32 to pass through the clear aperture CAg of a reflective mirror 54 of the first repeat positioner 52, e.g. a first galvanometer. According to a preferred form of the present invention, the mirror 54 of the first repeat positioner 52 has a clear aperture positioner is diagrammatically shown in FIG. 2 for the sake of clarity, it is to be appreciated that generally a pair of repeat positioners 52, 56 are provided (see FIG. 20) for redirecting the three equally sized and shaped collimated beams 28, 30, 32.

The motorized drive 50 supports the illumination prism 40 and facilitates adjustment of the illumination prism 40, relative to the first mirror 54 of the first repeat positioner 52, so that both of the two outer beams 28, 32 and the central beam 30 will all substantially converge with one another at the first mirror 54 of the first repeat positioner 52. Once all three beams contact and reflect off the first mirror 54, all three beams 28, 30, 32 begin to re-expand to a specific pitch and spacing from one another prior to reaching an F-Theta lens 60. The F-Theta lens 60 is of a multi-element design which receives the re-expanding laser beams from the second mirror 58 of the second repeat positioner 56 (not shown in FIG. 3) at a rear surface 62 thereof. The expanded three beams of light are each then altered, via the inherent optical characteristics of the F-Theta lens 60 in a conventional manner. Finally, the altered light is then emitted from a front surface 64, of the F-Theta lens 60, toward the object to be processed 12.

According to a preferred form of the invention, the F-Theta lens 60 generally has a focal length of about 76.3 mm, has a scan field of about 30 mm×30 mm and has a clear aperture of 10 mm in diameter.

The light emitted from the front surface 64 of the F-Theta lens 60 is directed or imaged at a target, a substrate or some other object to be processed 12. Preferably the object to be processed 12 is located at a distance of about 50 microns from a center of the F-Theta lens 60 (when measured along the optical axis A). The light emitted from the front surface 62 of the F-Theta lens 60 is directed at the object to be processed 12. The object to be processed 12 is spaced from the F-Theta lens 60 by a distance which is greater than the focal length of the F-Theta lens 60.

A spot diameter of each one of the three separate m-shaped laser beams is approximately 1.2 mm while the spot pitch is approximately 5.08 mm. The spot diameter of the three separate laser beams, redirected by the illumination prism 40, is about 1.2 mm while a spot diameter is 1.2 mm.

Figure 4:
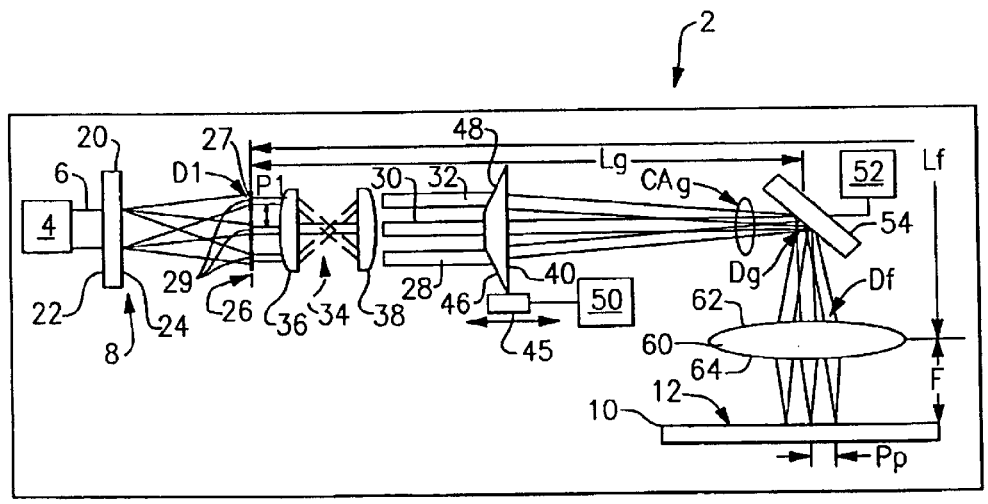
FIG. 4 is a diagrammatic view showing a variation of the first embodiment for use with focal point machining.

Turning now to FIG. 4, a brief discussion concerning this variation of the first embodiment will now be discussed. In this embodiment, identical elements are provided with the identical reference numerals as the above discussed embodiment and a further detailed description concerning such elements is not provided.

It is to be appreciated that this embodiment is substantially identical to the embodiment of FIG. 3 with the only modification being adjustment of the location of the object to be processed 12 with respect to the F-Theta lens 60. According to this embodiment, instead of locating the object to be processed 12 at a distance which is greater than the focal plane of the F-Theta lens 60, as with the embodiment of FIG. 3, the object to be processed 12 is located closer to the F-Theta lens 60. That is, the object to be processed 12 is located precisely at the focal plane of the F-Theta lens 60. By this arrangement, focal point machining of the object to be processed 12, as described above, can be readily achieved by the laser beam delivery system 2. In all other respects, the embodiment of FIG. 4 is identical to the embodiment of FIG. 3 and a further discussion concerning the same is not provided.

Figure 5:
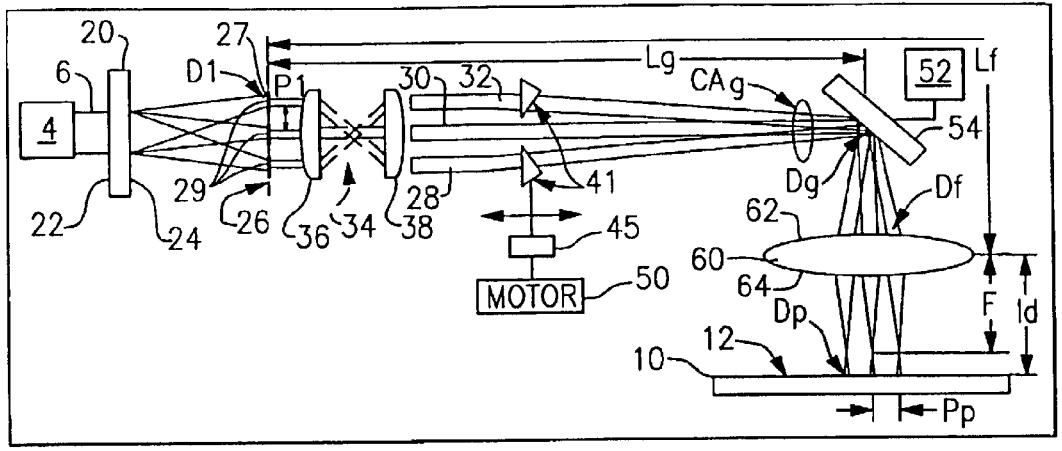
FIG. 5 is a diagrammatic view of a second embodiment of the laser beam delivery system for imagining.

Turning now to FIG. 5, a detailed description concerning a second embodiment for imagining, according to the present invention, will now be described. As this embodiment is very similar to the first embodiment, identical elements are given the identical reference numerals and a further detailed description concerning those previously discussed elements is not provided.

The major difference between the second embodiment of FIG. 5 and the embodiment of FIG. 3 is the arrangement of the converging optics. According to this embodiment, the single illumination prism 40 of FIG. 3 is eliminated in favor of two spaced apart smaller prisms 41, i.e., a converging mechanism. Each one of the smaller spaced apart prisms 41 is arranged to converge one of the two outer beams so that the illumination path of each of the outer beams 28, 32 passes solely through the clear aperture CAg of the mirror of the first repeat positioner, while the central beam is not affected by and remains unaltered by either one of the two smaller prisms 41. Both of the smaller illumination prisms are connected to and supported by an adjustment assembly 45, connected to a motorized drive 50 only diagrammatically shown in the drawings, which facilitates conveying the two smaller prisms 41 axially to and fro along the optical axis A of the laser beam delivery system 2 so that both prisms 41 can be simultaneously conveyed with one another to and fro along the optical axis A of the laser beam delivery system 2, as necessary, to adjust the degree of overlap of the three equally sized and shaped collimated laser beams 28, 30, 32. Preferably each one of the two smaller illumination prisms 41 pivots about a central pivot axis to control the converging angle of the associated outer beams 28 or 32 with respect to the central beam 30. By adequate control of the position and orientation of these two smaller prisms 41, the desired convergence of the two outer beams 28, 32 so as to obtain the desired degree of overlap with the central beam 30 can be achieved so that all three beams 28, 30, 32 pass solely through the clear aperture CAg of the mirror of the first repeat positioner. In all other respects, this embodiment is substantially identical to the embodiment of FIG. 3.

Figure 6:
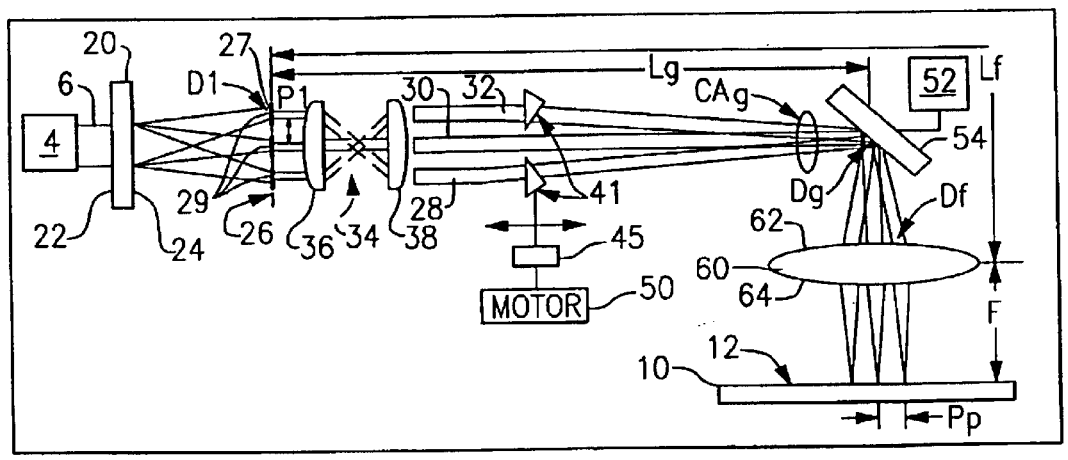
FIG. 6 is a diagrammatic view showing a variation of the second embodiment for use with focal point machining.

Turning now to FIG. 6, a brief discussion concerning this variation of the first embodiment will now be discussed. In this embodiment, identical elements are provided with the identical reference numerals as the above discussed embodiment and a further detailed description concerning such elements is not provided.

It is to be appreciated that this embodiment is substantially identical to the embodiment of FIG. 5 with the only modification being repositioning of the location of the object to be processed 12 with respect to the F-Theta lens 60. According to this embodiment, instead of locating the object to be processed 12 at a distance which is greater than the focal plane of the F-Theta lens 60, as with the embodiment of FIG. 5, the object to be processed 12 is located closer to the F-Theta lens 60. That is, the object to be processed 12 is located precisely at the focal plane of the F-Theta lens 60. By this arrangement, focal point machining of the object to be processed 12, as described above, can be readily achieved by the laser beam delivery system 2. In all other respects, the embodiment of FIG. 6 is identical to the embodiment of FIG. 5 and a further discussion concerning the same is not provided.

Figure 7:
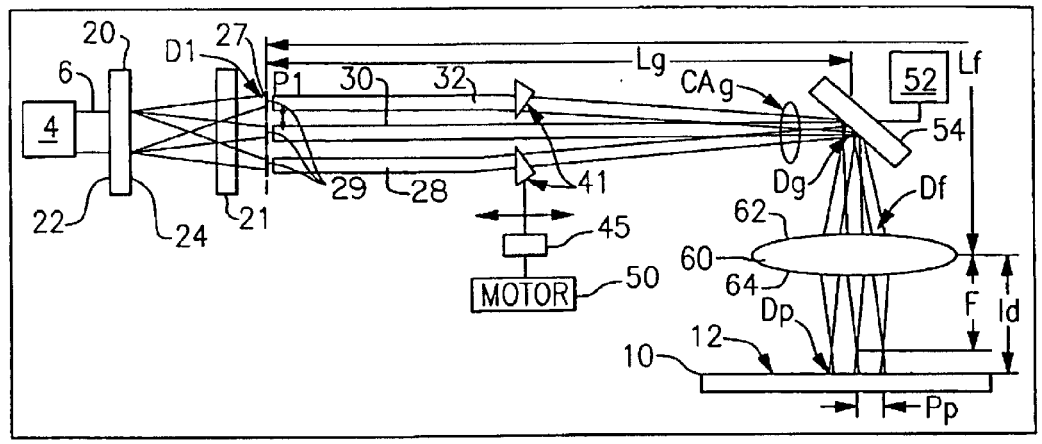
FIG. 7 is a diagrammatic view of a third embodiment of the laser beam delivery system for imagining.

Turning now to FIG. 7, a third embodiment will be discussed. According to this embodiment, a second computer generated hologram 21 is provided at a location between the first computer generated hologram 20 and the imagining plane P of the first computer generated hologram 20. The second computer generated hologram 21 has a first front surface which receives the three separate laser beams outputted by the first computer generated hologram, as with the first embodiment. The second computer generated hologram, due to its internal light altering characteristics, converges the three separate laser beams into three collimated laser beams and output the three laser beams from a rear surface thereof. These three collimated laser beams are outputted and arranged to pass through one of the apertures of the shutter 27, provided that the associated door 29 is in its opened position, as discussed above. In all other respects, this embodiment is substantially identical to the second embodiment of FIG. 5. The first and second computer generated holograms 20 and 21 assist with altering the contour of the laser beam to have a substantially flat top profile (see FIG. 3B).

Figure 8:
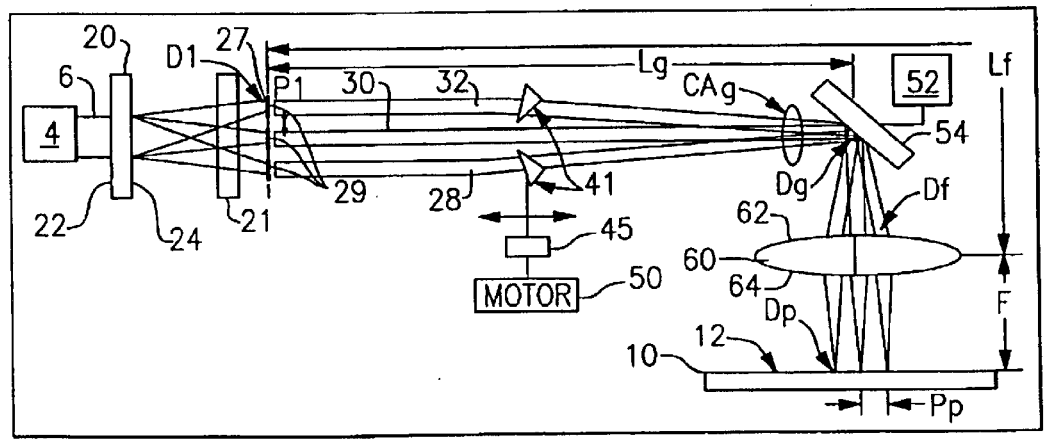
FIG. 8 is a diagrammatic view showing a variation of the third embodiment for use with focal point machining.

Turning now to FIG. 8, a brief discussion concerning this variation of the third embodiment will now be discussed. In this embodiment, identical elements are provided with the identical reference numerals as the above discussed embodiments and a further detailed description concerning such elements is not provided.

It is to be appreciated that this embodiment is substantially identical to the embodiment of FIG. 7 with the only modification being a change in the location of the object to be processed 12 with respect to the F-Theta lens 60. According to this embodiment, instead of locating the object to be processed 12 at a distance which is greater than the focal plane of the F-Theta lens 60, as with the embodiment of FIG. 7, the object to be processed 12 is located closer to the F-Theta lens 60. That is, the object to be processed 12 is located precisely at the focal plane of the F-Theta lens 60.

By this arrangement, focal point machining of the object to be processed 12, as described above, can be readily achieved by the laser beam delivery system 2. In all other respects the embodiment of FIG. 8 is identical to the embodiment of FIG. 7.

Figure 9:
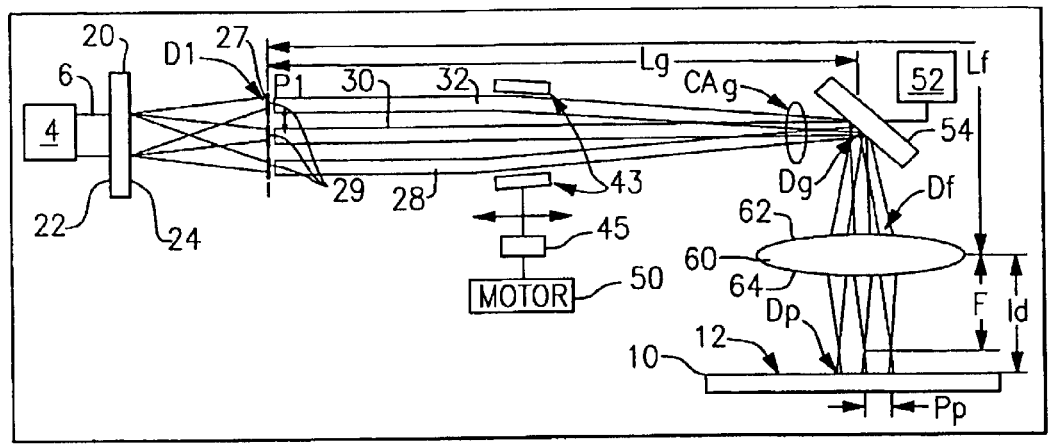
FIG. 9 is a diagrammatic view of a fourth embodiment of the laser beam delivery system for imagining.

Turning now to FIG. 9, according to this fourth embodiment, the collimating optics comprises a pair of shallow angle reflectors or deflective mirrors 43 i.e., a converging mechanism. The two mirrors 43 are supported by an adjustment assembly 45 connected to a motorized drive 50, only diagrammatically shown in the drawings, and the reflective surfaces of the two mirrors 43 face one another. Each one of two mirrors 43 is pivotable about a pivot axis by a separate drive (not shown) which controls the inclination angle of a plane, defined by each of the mirrors 43, relative to the optical axis A of the laser beam delivery system 2. By adjusting the angle formed between the plane of each of the mirrors 43 and the optical axis A, the degree of convergence of the associated outer beams 28, 32 can be altered to facilitate passing the two outer beams through the clear aperture CAg of the mirror 54 of the first repeat positioner 52.

The adjustment assembly 45 is conveyable to and fro along the optical axis A, by the motor 50, to adjust further the degree of convergence of the two outer laser beams as they reflect off from the two mirrors 43. In all other respects, this embodiment is substantially identical to the first embodiment of the present invention and thus a further detailed description concerning those previously discussed elements is not provided.

Figure 10:
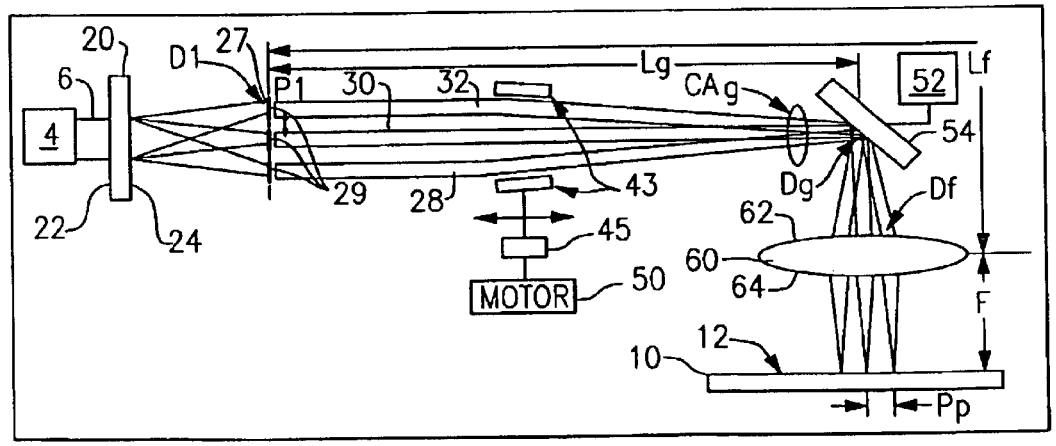
FIG. 10 is a diagrammatic view showing a variation of the fourth embodiment for use with focal point machining.

Turning now to FIG. 10, a brief discussion concerning this variation of the fourth embodiment will now be discussed. In this embodiment, identical elements are provided with the identical reference numerals and a further detailed description concerning such elements is not provided.

It is to be appreciated that this embodiment is substantially identical to the fourth embodiment of FIG. 9 with the only modification being the change in the location of the object to be processed 12 with respect to the F-Theta lens 60. According to this embodiment, instead of locating the object to be processed 12 at a distance which is greater than the focal plane of the F-Theta lens 60, as with the embodiment of FIG. 8, the object to be processed 12 is located closer to the F-Theta lens 60. That is, the object to be processed 12 is located precisely at the focal plane of the F-Theta lens 60. By this arrangement, focal point machining of the object to be processed 12, as described above, can be readily achieved by the laser beam delivery system 2. In all other respects the embodiment of FIG. 10 is identical to the embodiment of FIG. 9.

Figure 11:
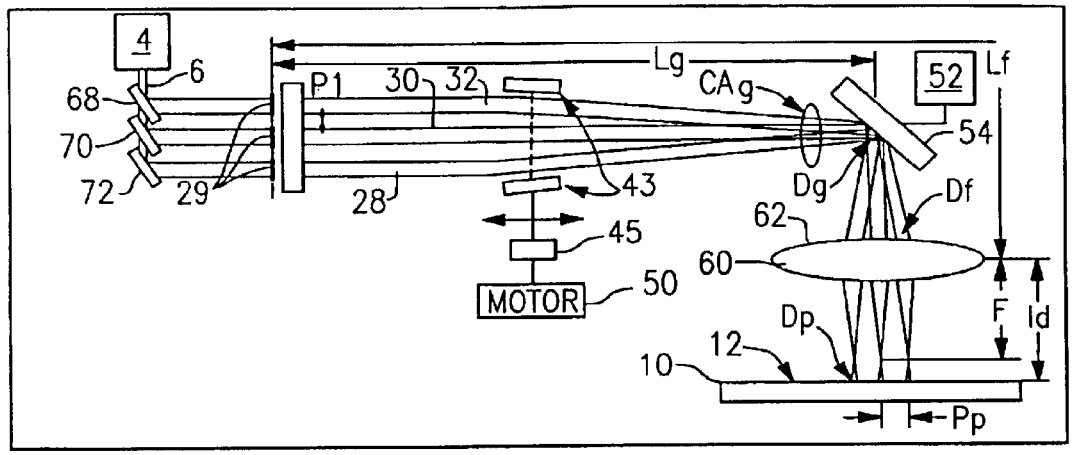
FIG. 11 is a diagrammatic view of a fifth embodiment of the laser beam delivery system for imagining.

Turning now to FIG. 11, a detailed description concerning a fifth embodiment for imagining, according to the present invention, will now be described. As this embodiment is very similar to the fourth embodiment, identical elements are given the identical reference numerals and a further detailed description concerning those previously discussed elements is not provided.

The major difference between the fifth embodiment of FIG. 11 and the embodiment of FIG. 9 is the arrangement for splitting the laser into a plurality of separate collimated beams. In all other respects, this embodiment is substantially identical to the embodiment of FIG. 9.

Figure 15:
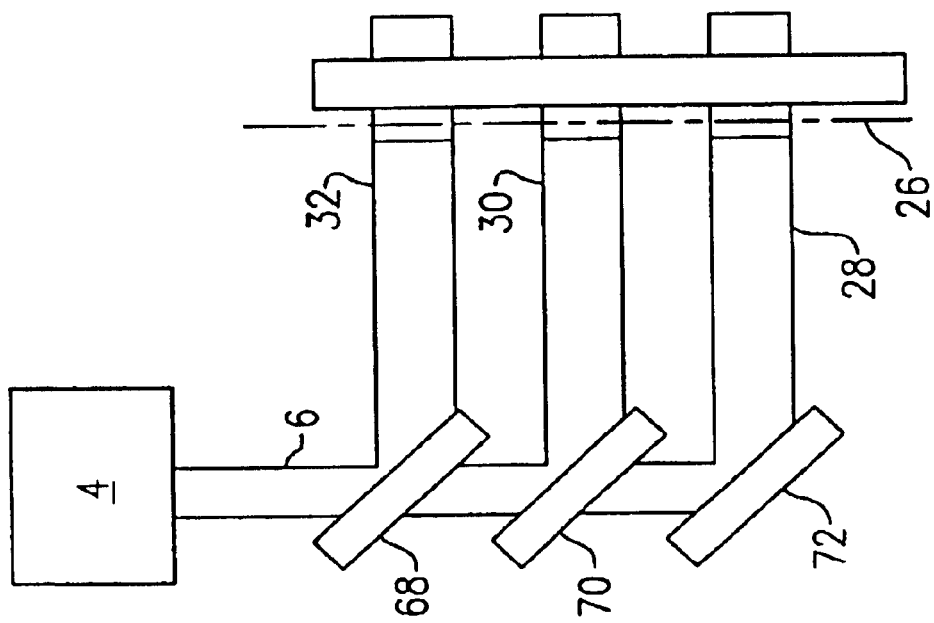
FIG. 15 is an exploded view showing separation of the laser beam into a plurality of separate and collimated beams for supply along the optical axis.

With reference to FIGS. 11 and 15, the arrangement for splitting the single laser beam into a plurality of collimated laser beams will now be described. As can be seen in those Figures, the laser beam 6 is emitted from the laser 4 and is directed at a first one 68 of a series, e.g. three, of partially reflected mirrors or beam splitters 68, 70, 72. The partially reflected mirrors or beam splitters 68, 70, 72 are designed to reflect a portion of the supplied light along the optical axis A of the laser beam delivery system 2 while allowing a remaining portion of the supplied laser beam 6 to pass therethrough. According to one form of the present invention, the first beam splitter 68 is located at an angle of 45° with respect to the optical axis A and is a 30/70 beam splitter. That is, the beam splitter 68 will reflect approximately 30 percent of the supplied laser beam in a collimated form along the optical axis A as beam 32 while allowing the remaining 70 percent of the supplied laser beam to pass through the first partially reflective mirror or beam splitter 68.

The second partially reflected mirror or beam splitter 70 is spaced a small distance from the first beam splitter 68. The second partially reflected mirror or beam splitter 70 is also oriented at an angle of about 45° with respect to the optical axis A of the laser beam delivery system 2. The remaining 70 percent of the laser beam which passes through the first partially reflected mirror or beam splitter 68 is directed at and contacts the reflective surface of the second partially reflected mirror or beam splitter 70. As this beam splitter 70 is a 50/50 beam splitter, the second partially reflected mirror or beam splitter 70 will reflect about 50 percent of the supplied laser beam 6 while allowing the remaining 50 percent of the supplied laser beam 6 to pass through the second partially reflected mirror or beam splitter 70. The laser beam reflected by the second partially reflected mirror or beam splitter 70 is reflected along the optical axis A parallel to the first reflected laser beam as beam 30.

A third fully reflective mirror 72 is located adjacent the second beam splitter so that the fully reflective mirror 72 receives all of the remaining light which passes through the second beam splitter and the fully reflective mirror 72 reflects 100 percent of the remaining supplied light along the optical axis A of the laser beam delivery system 2 as beam 28. The laser beam reflected by the fully reflective mirror 72 is reflected along the optical axis A parallel to the first and the second reflected laser beams 30 and 32. It is to be appreciated that all three beams 28, 30, 32 are substantially collimated as the supplied laser beam was collimated and the first and second beam splitter and the fully reflective mirror 72 merely reflect the supplied laser beams in a collimated fashion along the optical axis A of the laser beam delivery system 2.

The spacing between the separate laser beams can be readily modified by either increasing or decreasing the spacing between the first beam splitter, the second beam splitter and the fully reflective mirror 72. In addition, as would be readily apparent to one skilled in the art, the amount of separate laser beams generated from the single laser beam can be increased or decreased by the varying the amount of beam splitters placed in front of the fully reflective mirror 72 and altering the reflective characteristics of the beam splitters.

Figure 12:
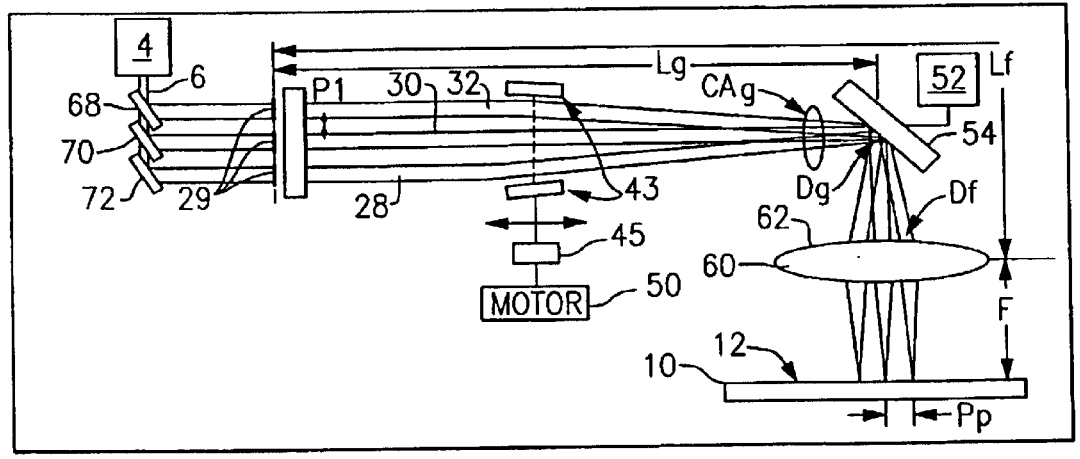
FIG. 12 is a diagrammatic view showing a variation of the fifth embodiment for use with focal point machining.

Turning now to FIG. 12, a brief discussion concerning this variation of the fifth embodiment will now be discussed. In this embodiment, identical elements are provided with the identical reference numerals as the above discussed embodiment and a further detailed description concerning such elements is not provided.

It is to be appreciated that this embodiment is substantially identical to the embodiment of FIG. 11 with the only modification being modification of the location of the object to be processed 12 with respect to the F-Theta lens 60. According to this embodiment, instead of locating the object to be processed 12 at a distance which is greater than the focal plane of the F-Theta lens 60, as with the embodiment of FIG. 11, the object to be processed 12 is located closer to the F-Theta lens 60. That is, the object to be processed 12 is located precisely at the focal plane of the F-Theta lens 60. By this arrangement, focal point machining of the object to be processed 12, as described above, can be readily achieved by the laser beam delivery system 2. In all other respects the embodiment of FIG. 12 is identical to the embodiment of FIG. 11.

Figure 13:
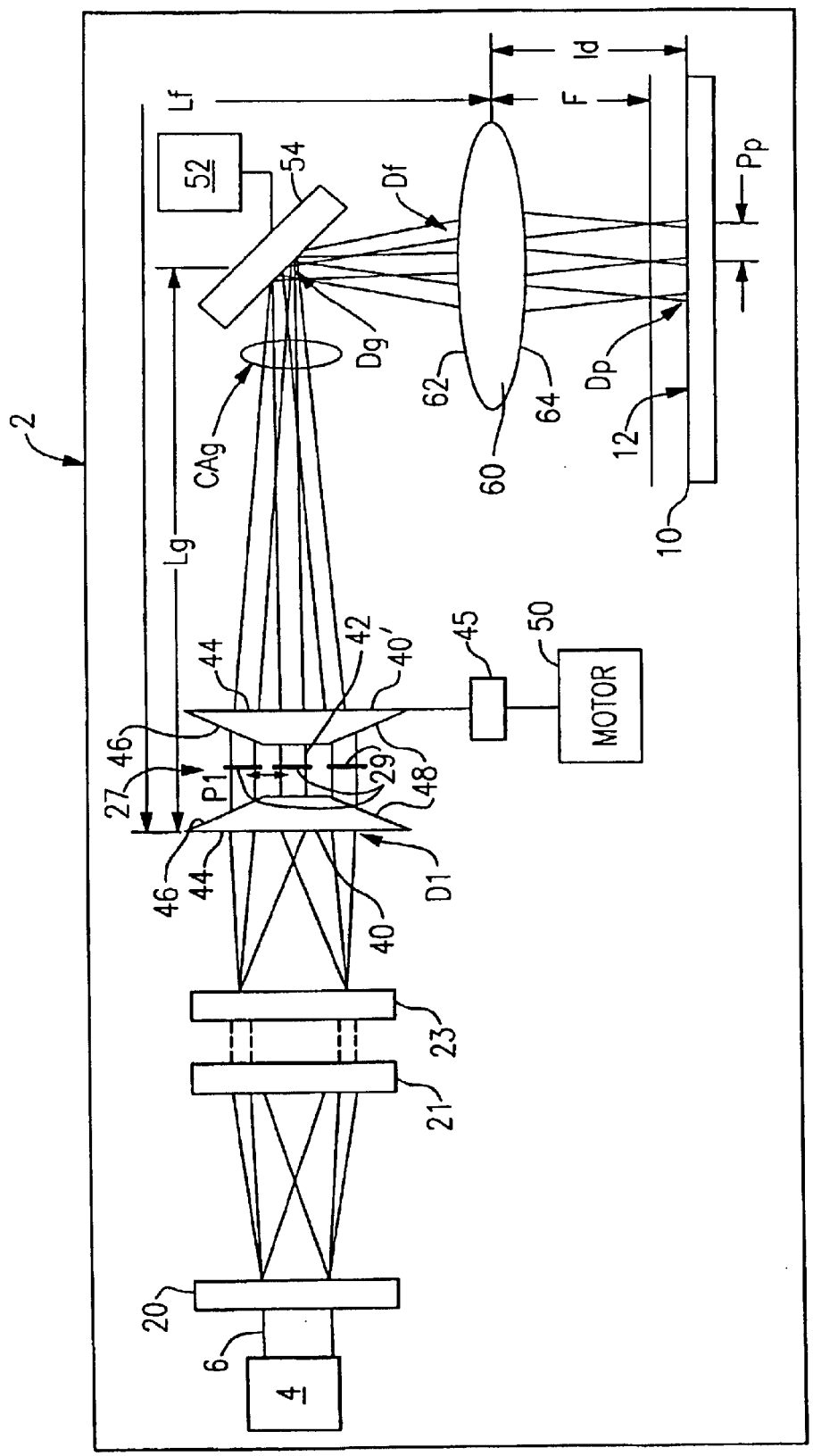
FIG. 13 is a diagrammatic view of a sixth embodiment of the laser beam delivery system for imagining.

Turning now to FIG. 13, a detailed description concerning a sixth embodiment for imagining, according to the present invention, will now be described. As this embodiment is very similar to the first embodiment, identical elements are given the identical reference numerals and a further detailed description concerning those previously discussed elements is not provided.

The major difference between the sixth embodiment of FIG. 13 and the embodiment of FIG. 3 is the shaping and collimating optics. According to this embodiment, the laser beam 6 travels through the first computer generated hologram 20 where the light is collimated. The collimated light exits from the front surface of the computer generated hologram 20 and is supplied to a rear surface of a second computer generated hologram 21. The second computer generated hologram 21 converts the collimated light from a gaussian profile to a substantially pseudo flat top profile and emits the pseudo flat top profile from a front surface thereof. The light then enters the rear surface of a third computer generated hologram 23 where the light is shaped and emitted, from a front surface of the third computer generated hologram 23, toward a first of a pair of illumination prisms 40, 40', i.e., a converging mechanism, as three equally sized and shaped laser beams 28, 30, 32. Each one of the illumination prisms 40, 40' has a pair of opposed planar surfaces 42, 44 which both extend perpendicular to the optical axis A of the laser beam delivery system 2 and a pair of inclined surfaces 46, 48 which each form an acute angle with the optical axis A of the laser beam delivery system 2. The two illumination prisms 40, 40' are positioned in an opposed relationship to one another. A shutter 27, having a plurality of openable and closable doors, is positioned between the two illumination prisms 40, 40' to control the number of separate beams 28, 30 or 32 that are allowed to pass through the shutter 27 and be directed at the object to be processed 12.

The second illumination prism 40' converges the two outer beams so that the illumination path of each of the outer beams 28, 32 passes solely through the clear aperture CAg of the mirror 54 of the first repeat positioner 52, while the central beam 30 is not affected by and remains unaltered by the first and second illumination prisms 40, 40'. The second illumination prism 40' is connected to and supported by an adjustment assembly 45, connected to a motor drive 50, so that the second illumination prism 40' can be conveyed to and fro along the optical axis A of the laser beam delivery system 2, as necessary, to adjust the degree of overlap of the three equally sized and shaped collimated laser beams 28, 30, 32. By adequate control of the second illumination prism 40' the desired convergence of the two outer beams 28, 32, so that they sufficiently overlap the central beam 30, can be achieved so that all three beams 28, 30, 32 pass solely to the clear aperture CAg of the mirror of the first repeat positioner. In all other respects, this embodiment is substantially identical to the embodiment of FIG. 3.

Figure 14:
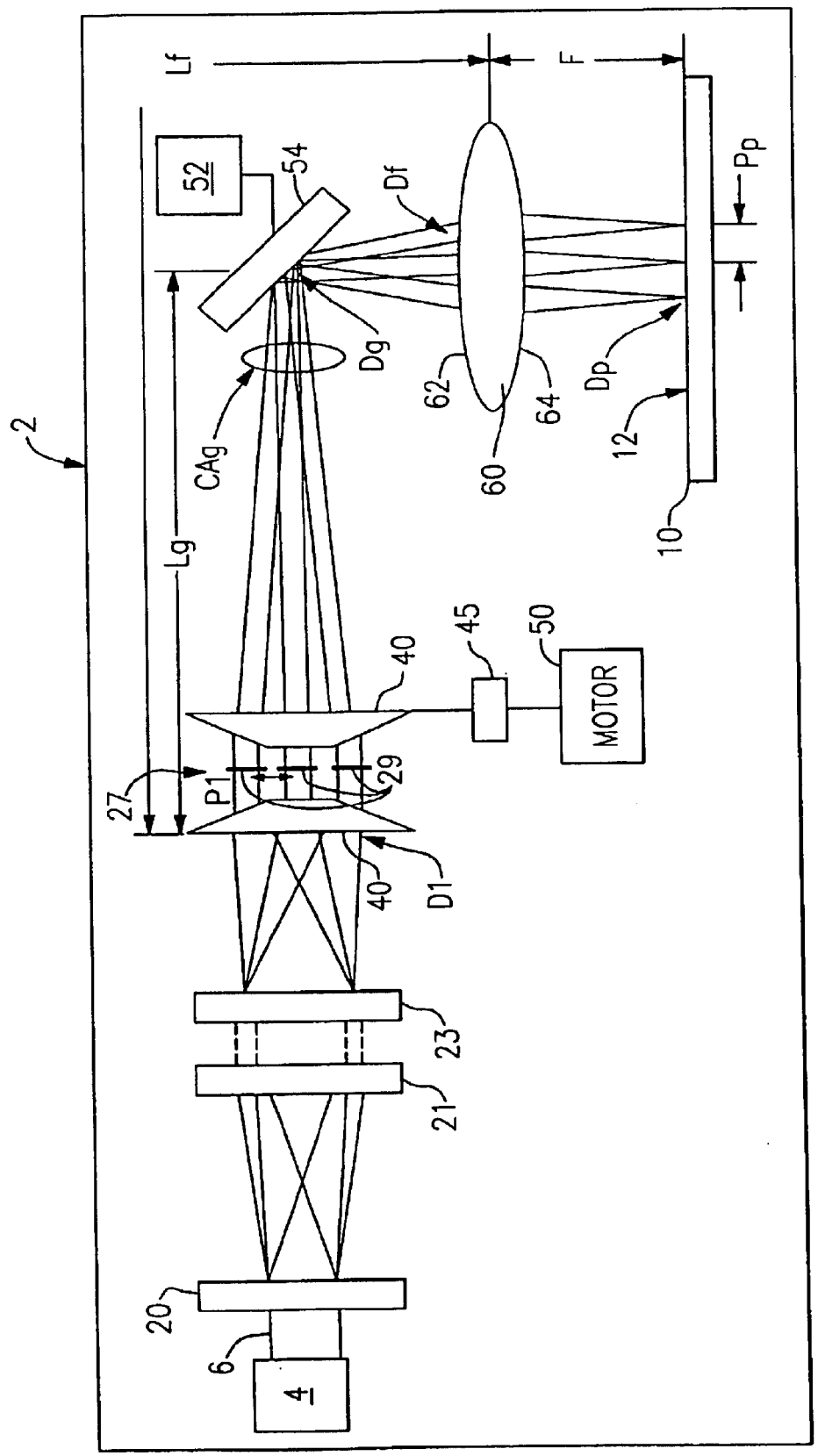
FIG. 14 is a diagrammatic view showing a variation of the sixth embodiment for use with focal point machining.

Turning now to FIG. 14, a brief discussion concerning this variation of the sixth embodiment will now be discussed. In this embodiment, identical elements are provided with the identical reference numerals as the above discussed embodiment and a further detailed description concerning such elements is not provided.

It is to be appreciated that this embodiment is substantially identical to the embodiment of FIG. 13 with the only modification being repositioning of the location of the object to be processed 12 with respect to the F-Theta lens 60. According to this embodiment, instead of locating the object to be processed 12 at a distance which is greater than the focal plane of the F-Theta lens 60, as with the embodiment of FIG. 12, the object to be processed 12 is located closer to the F-Theta lens 60. That is, the object to be processed 12 is located precisely at the focal plane of the F-Theta lens 60. By this arrangement, focal point machining of the object to be processed 12, as described above, can be readily achieved by the laser beam delivery system 2. In all other respects the embodiment of FIG. 14 is identical to the embodiment of FIG. 13 and a further discussion concerning the same is not provided.

Figure 16A:
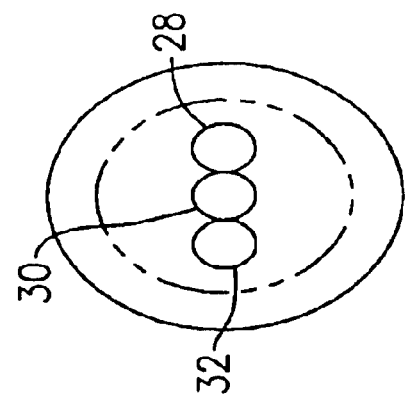
FIGS. 16A–C show three variations of the overlap of the spots when passing through the clear aperture of the mirror of a first one of the repeat positioners.
Figure 16C:
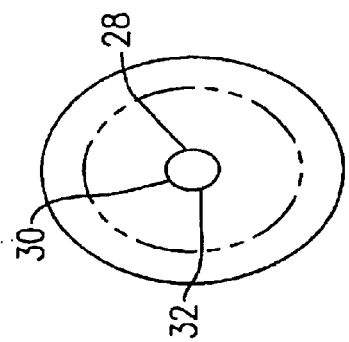
Figure 16B:
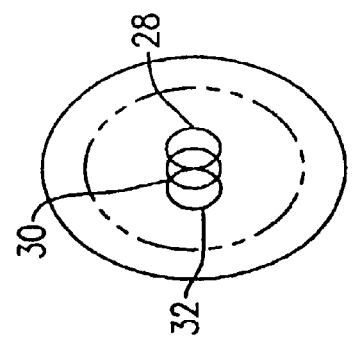

With reference to FIGS. 16A to 16C, a typical overlap of the three separate collimated laser beams can be seen as the overlapped light passes through the clear aperture CAg of the mirror. As can be seen in FIG. 16A, the three separate laser beams have converged to a certain extent but do not completely overlap with one another when passing through the clear aperture CAg of the mirror 54 of the first repeat positioner.

With reference to FIG. 16B, there is substantial overlap of the three laser beams as they pass through the clear aperture CAg. Lastly, as can be seen in FIG. 16C, the three separate laser beams have substantially overlapped with one another to essentially combine a single beam passing through the clear aperture CAg of the mirror 54 of the first reflective surface.

Figure 17:
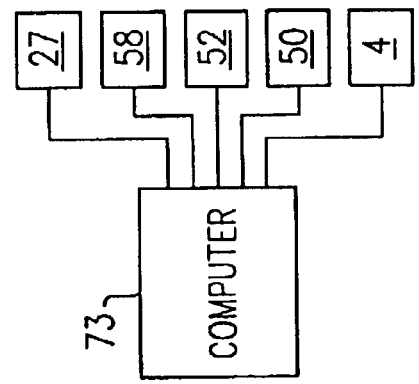
FIG. 17 shows a diagrammatic representation showing a control system for altering the spot size and spacing of apertures, in the object to be processed, to compensate for any distortion in the F-Theta lens.

Turning now to FIG. 17, a brief description concerning the control system, for use with the laser beam delivery system 2, will now be provided. A computerized control system 73 is connected to the drives of both of the first and the second repeat positioners, 52, 58 and is also connected to the drive controlling two and fro motion of the illumination optics assembly along the optical axis A. In the event that the illumination optics are also provided with separate motors for controlling the pivoting of the separate prisms or mirrors (see FIGS. 5, 6, 7, 8, 11 and 12), such additional drives would also be connected to and controlled by the control system 73. Finally, the laser 4 and the shutter 27 are connected to and controlled by the control system to control opening and closing of the doors 29 and facilitate control of how many and which laser beams 28, 30 and/or 32 are allowed to pass through the shutter 27.

Figure 18:
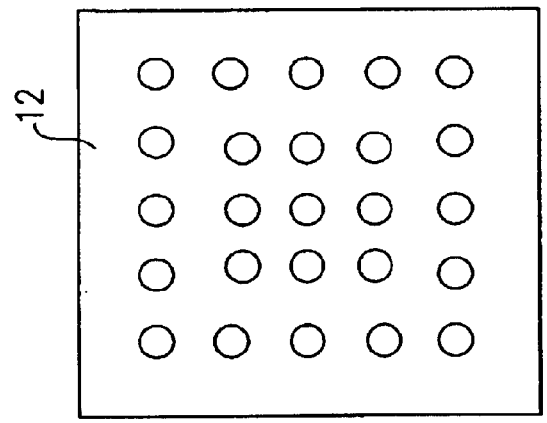
FIG. 18 shows an object having a plurality of apertures machined therein without any compensation for the distortion of the F-Theta lens.

With reference now to FIG. 18, an inherent problem associated with the F-Theta lens 60 will now be briefly described. As can be seen in this drawing, the object, which has been processed, has a plurality of apertures formed therein. All of the apertures are designed to be of an equal size and be equally spaced from one another in an array. However, due to manufacturing tolerances and other imperfections in the F-Theta lens 60, optical distortion generally occurs and this results in deformation and/or misalignment of the formed array of apertures in the processed object, as shown in FIG. 18, for example. The resulting imperfections in the F-Theta lens 60 are generally unacceptable for most commercial manufacturing applications. Accordingly, the present invention utilizes a control system to compensate for the imperfections caused by the F-Theta lens 60. To overcome this F-Theta lens 60 optic distortion problem, the present invention utilizes a control system in which the target area is mapped, in a conventional fashion, to determine the area or areas where the imperfections in the F-Theta lens 60 occur and where necessary compensation is required. Once such mapping is achieved, the control system can then be programmed, when forming an aperture or some other feature in an area requiring compensation, to control the illumination optics and provide the necessary compensation so as to form a desired aperture in the object to be processed 12 at the precise location. Due to such compensation, the system can form an array which is deemed acceptable for commercial manufacturing applications. As such teaching is well known in the art, a further detail discussion concerning the same is not provided.

Figure 19:
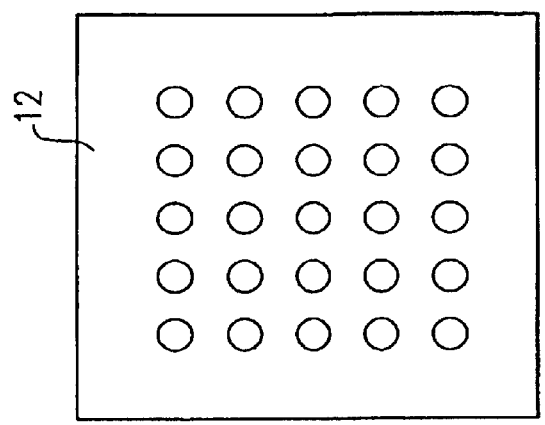
FIG. 19 shows the object having a plurality of apertures therein in which the control system compensated for the distortion in the F-Theta lens.

As can be seen in FIG. 19, for example, by suitable programming of the control system to compensate for the imperfections in the F-Theta lens 60, uniformly sized, shaped and spaced apertures can be formed in the object to be processed 12 at all of the desired locations.

Figure 20:
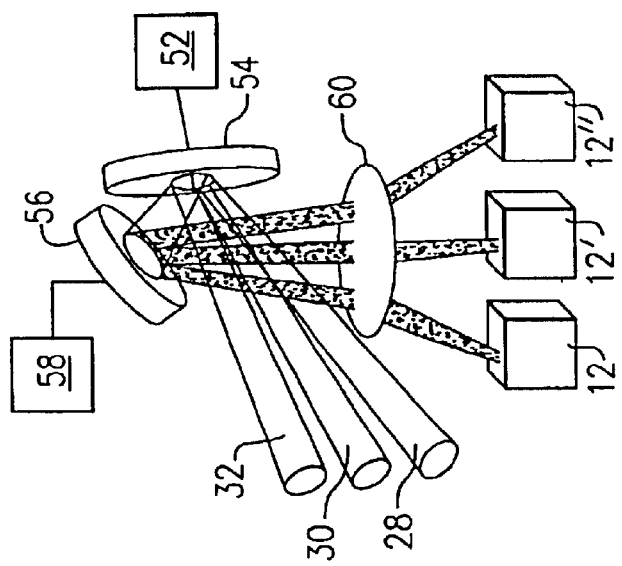
FIG. 20 is a diagrammatic representation showing of the splitting three beams for use in processing three objects simultaneously with one another to increase the throughput of a system.

With reference now to FIG. 20, one use of the present invention will now be briefly described. As can be seen in this Figure, there are three separate beams 28, 30, 32 which pass through the illumination prism (not shown) and are directed at the first reflective mirror 54 of the first galvometer 52 and are reflected to the second reflective mirror 56 of the second galvometer 58. As the light is reflected off the second mirror 54 of the second galvometer 58, the three separate beams commence re-expansion and thereby result in three separate beams 28, 30, 32. The three separate beams 28, 30, 32 can, thereafter, be focused by a focusing lens 60 at three different objects to be processed 12, 12', 12" to facilitate processing of three separate objects simultaneously with one another so that manufacturing the throughput of a system can be increased. It is to be appreciated that the throughput can be varied by merely increasing or decreasing the amount of laser beams used to simultaneously process a desired object.

Figure 21:
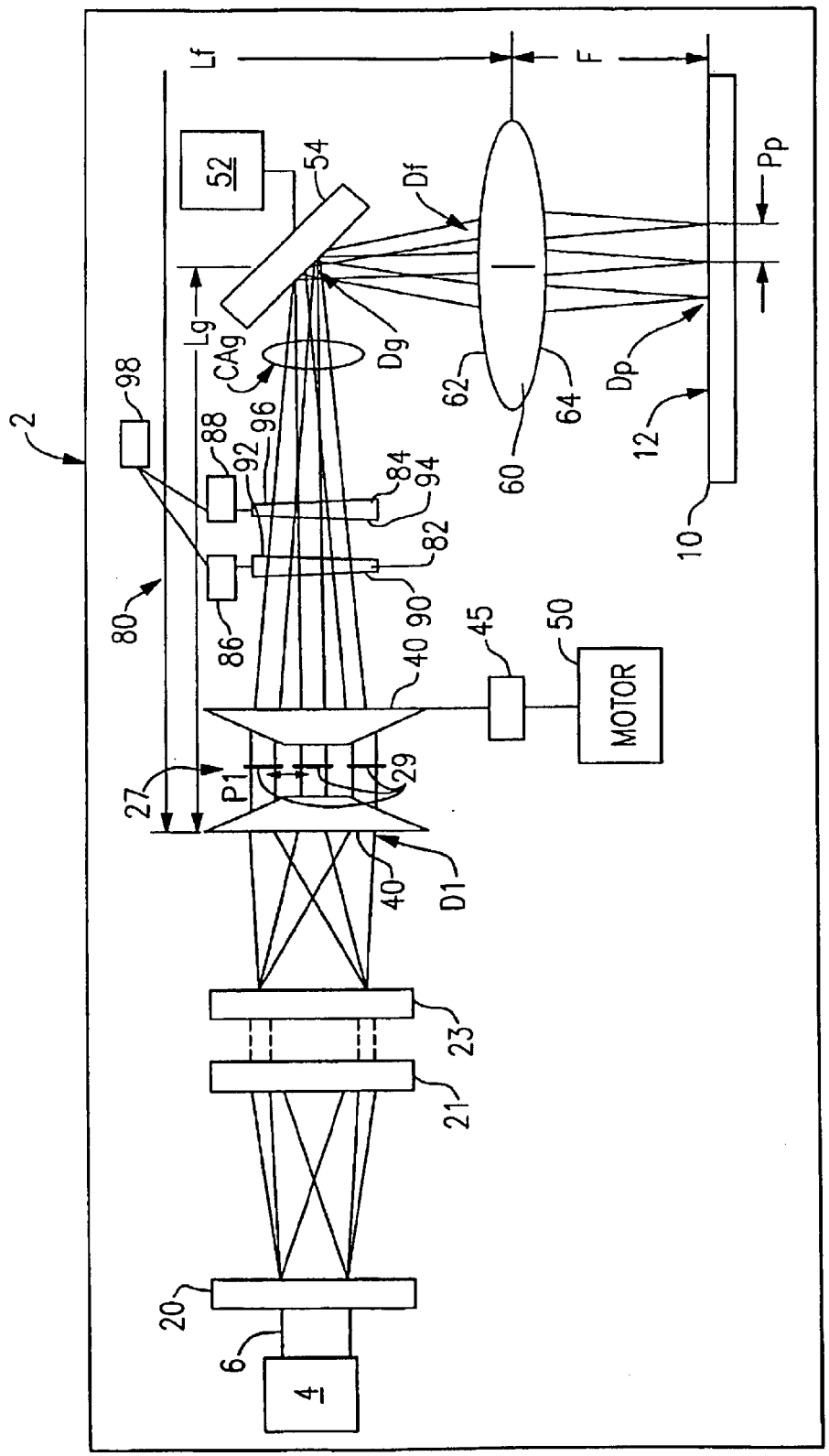
FIG. 21 is a diagrammatic view of the embodiment shown in FIG. 14 with the addition of a trepanning module.

With reference matter FIG. 21 a detailed description concerning a modification of the embodiment of FIG. 14 will now be discussed in detail. As this embodiment is very similar to the previous embodiment, only a detailed discussion will be provided concerning the differences between this embodiment and the previous embodiment of FIG. 14.

The major modification of this embodiment relates to the addition of trepanning module 80 to the converging laser beams 28, 30, 32 prior to the converging laser beams 28, 30, 32 passing through the clear aperture CAg of the first reflective mirror 54. The trepanning module 80 generally comprises first and second spaced apart sequentially arranged rotating wedge prisms 82 and 84. Both of the wedge prisms 82 and 84 are aligned along and are concentric with the optical axis of the laser beam delivery system 2. The spaced apart sequentially arranged rotating wedge prisms 82 and 84 which are both arranged to rotate relative to the optical axis of the three (3) converging beams 28, 30, 32. To facilitate such rotation, an outer perimeter of each wedge prism 82 and 84 is coupled by a belt (not numbered) or the like to a separate rotational drive 86 and 88, such as an electric motor, to supply rotational drive to the wedge prisms 82 and 84 and induce rotation about the optical axis of the laser beam delivery system 2.

Figure 22:
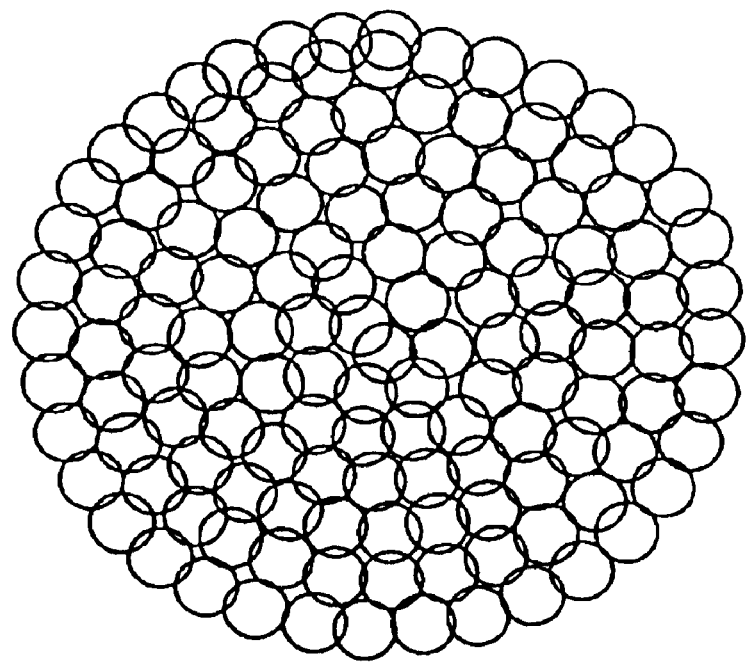
FIG. 22 is a diagrammatic view showing the trepanning path of a laser beam achieved by the trepanning module of FIG. 21.

The wedge prisms 82 and 84 both have a trapezoidal transverse cross sectional shape which facilitates altering, in a customary manner, any of the light as the laser beams pass through the wedge prisms 82 and 84. That is, a first front surface 90 or 94 of each of the wedge prisms 82 and 84 defines a plane which extends perpendicular to the optical axis of the laser beam delivery system 2 while the second rear surface 92 or 96 of each of the wedge prisms 82 and 84 defines a plane which forms an angle less than 90 degrees with the optical axis of the laser beam delivery system 2. During operation of the trepanning module 80, both of the wedge prisms 82 and 84 rotate about the optical axis of the laser beam delivery system 2 at a rotational speed of generally between about 7,000 to 20,000 revolutions per minute. However, to achieve the desired trepanning effect (see FIG. 22) the first wedge prism 82 rotates at a different speed than the second wedge prism 84. As a result of this relative rotation, as the three laser beams 28, 30, 32 enter the first front surface 90 of the first wedge prism 82 and pass therethrough, the three laser beams 28, 30, 32 are each slightly altered, e.g. the laser beams are each similarly bent as they exit from the rear surface 92 of the first wedge prism 82. The slightly altered light is then directed at and received by the first front surface 94 of the second wedge 84 prism and the light passes therethrough and is similarly altered, in a conventional fashion, as the light exits from the second rear surface 96 of the second wedge prism 84. The altered light then passes through the clear aperture CAg of the reflective mirror 54 and is directed at either the same object to be processed 12, as with the previous embodiment, or three separate objects to be processed 12, 12' 12" at the same time.

Due to the relative rotation of the first and second wedge shaped prisms 82 and 84, the slightly altered three laser beams 28, 30, 32, as they exit from the rear surface 92 of the first wedge prism 82 enters and is received at different locations along the first front surface 94 of the second wedge prism 84. Such variation in the entry location of the laser beams 28, 30, 32 causes a variation in the bend angle of the laser beams 28, 30, 32 as the laser beams 28, 30, 32 pass therethrough and exit from the second rear surface 96 of the second wedge prism 84. The net effect of the relative rotation and the variation in entry location of the laser beams 28, 30, 32 along the first front surface 94 of the second wedge prism 84 is to provide a mechanism which facilitates trepanning (see FIG. 22) of the laser beams 28, 30, 32 so that each laser beam is controlled to spiral either radially inwardly or radially outward in unison with one another during operation of the trepanning module 80. The two rotational drives 86 and 88 are connected to a computer 98 to facilitate control of the rotational speeds, rotational direction and the relative rotational difference between the first and second wedge prisms 82 and 84.

The trepanning module 80 facilitates a desired drilling, burning, machining, formation, etc., of a desired aperture or other feature in a desired surface of the object(s) to be processed 12, 12', 12". The first and second rotating wedge prisms 82 and 84, due to their high rotational speed, allow the trepanning effect to occur very quickly and efficiently since the spiraling movement of the three laser beams 28, 30, 32 is controlled solely by the two rotating wedge shape prisms 82 and 84 and none of the remaining components of the laser beam delivery system 2 require movement and thus are maintained at a fixed position.

During operation of the trepanning module 80, it is to be appreciated that the three laser beams 28, 30, 32, or only a single laser beam if desired, can be supplied continuously to the rotating first and second wedge prisms 82 and 84 to provide a continuous trepanning effect or, alternatively, the laser beam(s) can be pulsated at a desired rate, depending upon the particular application at hand. As noted above, the first and second repeat positioners 52 and 58 are maintained at a fixed position, during the operation of the trepanning module 80, and thus there is no need to wait for the repeat positions 52 and 58 to stabilize following movement. It is to be appreciated that the trepanning module 80, although only described with respect to the embodiment of FIG. 14, can be used in combination with any one of the above discussed embodiments disclosed herein.

If desired, one or more telescoping lenses can be located between the laser and the trepanning module 80 to facilitate desired expansion of the laser beams 28, 30, 32, prior to being altered by the trepanning module 80. In addition, one or more dilation lenses can be provided between the shutter and the trepanning module 80 to facilitate suitable dilation of the altered laser beam(s).

Figure 24:
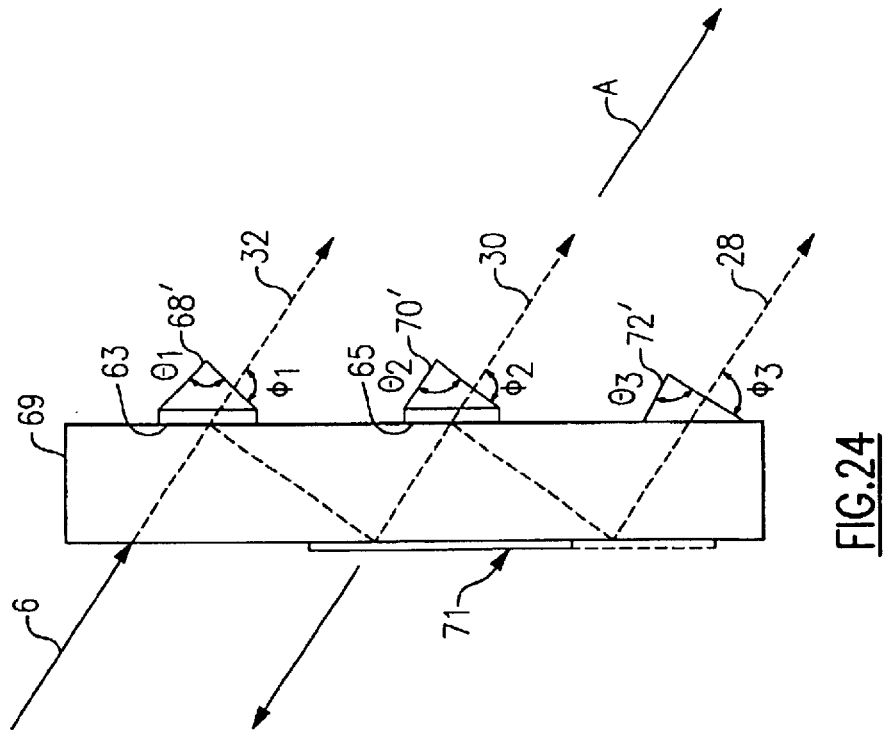
FIG. 24 is a diagrammatic elevational view showing yet another embodiment for separation of the laser beam into a plurality of separate and collimated beams for supply along the optical axis.
Figure 23:
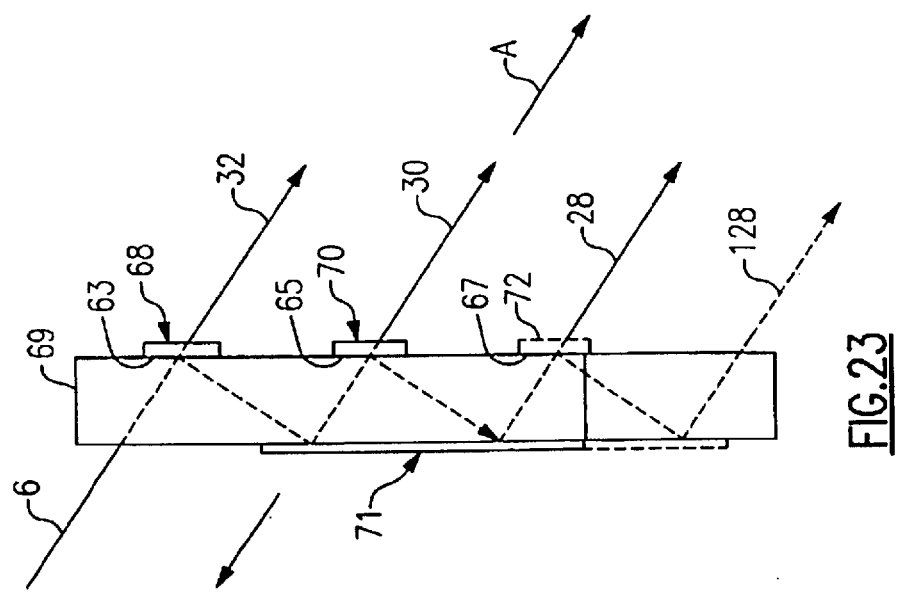
FIG. 23 is a diagrammatic elevational view showing a further embodiment for separation of the laser beam into a plurality of separate and collimated beams for supply along the optical axis.

With reference to FIGS. 23 and 24, two further arrangements for splitting the single laser beam into a plurality of collimated laser beams will now be described. The laser beam 6 may be, for example, an IR beam or UV YAG laser beam having a wavelength of either 355 nm or 266 nm. Alternatively, a $CO_2$ laser or a Q-Switched $CO_2$ laser having a wavelength of either of 9.3 or 9.4 micron or a 532 nm beam, for example, may also be utilized.

As can be seen in these Figures, the beam splitter device 69 may comprise, for example, a quartz, fused silica or IR material. The laser beam 6 is emitted from the laser (not shown) and is directed at a first beam splitter 68 of a series of or beam splitters, e.g., first and second partially reflected mirrors or beam splitters 68 and 70. The beam splitters 68, 70 are both designed to allow a portion of the supplied light to pass therethrough while reflect a remaining portion of the supplied laser beam 6. A transmission/reflective surfaces 63, 65 of both of the beam splitters 68, 70 extends transversely with respect to the optical axis A of the laser beam delivery system 2. According to FIG. 23, the first beam splitter 68 is a 30/70 or a 33.3/66.6 beam splitter that has its transmission/reflective surface arranged at an angle of between about 20° to about 80°, preferably about 60°, with respect to the optical axis A. The first beam splitter 68 will allow approximately 33.3 percent of the supplied laser beam, in a collimated form, to pass therethrough and be supplied along or parallel to the optical axis A as beam 32 while reflecting the remaining 66.6 percent of the supplied laser beam toward a rear reflective surface 71 of the splitter device 69 carrying a 100% reflective coating. All of the light reflected by the first beam splitter 68 is, in turn, reflected by the reflective surface 71 toward the second beam splitter 70.

The second beam splitter 70 extends and lies parallel to the first beam splitter 68, but is spaced a small distance therefrom depending upon the angle the first beam splitter 68 forms with the optical axis A. The transmission/reflective surface 65 of the second beam splitter 70 is also oriented at an angle of between about 20° to about 80°, preferably about 60°, with respect to the optical axis A of the laser beam delivery system 2. The remaining 66.6 percent of the laser beam, which is reflected by the first beam splitter 68 and the rear reflective surface 71, is directed at and contacts the transmission/reflective surface 65 of the second beam splitter 70. As the second beam splitter 70 is a 50/50 beam splitter, the second beam splitter 70 will allow about 50 percent of the supplied laser beam 6 to pass through the second partial beam splitter 70 and be supplied along the optical axis A as beam 30 while reflect the remaining portion (i.e., about 50 percent of the supplied laser beam 6) toward another area of the rear reflective surface 71.

Substantially the entire portion of the laser beam reflected by the second beam splitter 70 is, in turn, reflected by the reflective surface 71 and supplied along or parallel to the optical axis A as beam 28, parallel to the first and the second laser beams 30 and 32. It is to be appreciated that all three beams 28, 30, 32 are substantially collimated, as discussed above, and the first and second beam splitters 68 and 70 and the rear reflective surface 71 merely reflect a desired portion of the supplied laser beam in a collimated fashion along the optical axis A of the laser beam delivery system 2 as three separate beam 28, 30 and 32.

Tuning now to FIG. 24, a detail description concerning this further embodiment will now be provided. As this embodiment is very similar to the previous embodiment, only the differences between this embodiment and the previous embodiment will be discussed in detail.

As can be seen in this Figure, the splitter device 69 has at least two and possibly three integral prism wedges 68', 70' and 72'. As with the previous embodiment, the laser beam 6 is emitted from the laser (not shown) and is directed at a transmission/reflective surface 63 of a first prism wedge beam splitter 68' of a pair of partially reflective elements or beam splitters 68' and 70', respectively. The transmission/reflective surfaces 63, 65 of both of the prism wedge beam splitters 68', 70' are designed to allow a portion of the supplied light to pass therethrough while reflect a remaining portion of the supplied laser beam 6. Each of the prism wedge beam splitters 68' and 70' has a transmission/reflective surface 63, 65 which extend transverses with respect to the optical axis A of the laser beam delivery system 2. As with the previous embodiment, the first prism wedge beam splitter 68' is a 30/70 or a 33.3/66.6 beam splitter that has a transmission/reflective surface 63 which is arranged at an angle of between about 20° to about 80°, preferably about 60°, with respect to the optical axis A. The first prism wedge beam splitter 68' will allow approximately 33.3 percent of the supplied laser beam, in a collimated form, to pass therethrough and be supplied along or parallel to the optical axis A as beam 32 while reflecting the remaining 66.6 percent of the supplied laser beam toward a rear reflective surface 71 of the splitter device 69 carrying a 100% reflective coating. All of the light reflected by the first prism wedge beam splitter 68' is, in turn, reflected by the reflective surface 71 toward the second beam splitter 70'.

The second prism wedge beam splitter 70' also has a transmission/reflective surface 65 which lies parallel to but is spaced a small distance from the transmission/reflective surface of the first prism wedge beam splitter 68'. The transmission/reflective surface 65 of the second prism wedge beam splitter 70' is also oriented at an angle of between about 20° to about 80°, preferably about 60°, with respect to the optical axis A of the laser beam delivery system 2. The remaining 66.6 percent of the laser beam which is reflected by the first beam splitter 68' and the rear reflective surface 71 is directed at and contacts the transmission/reflective surface of the second prism wedge beam splitter 70'. As the second beam splitter 70' is a 50/50 beam splitter, the second prism wedge beam splitter 70' will allow about 50 percent of the supplied laser beam 6 to pass therethrough and be supplied along the optical axis A as beam 30 and reflect the remaining portion (i.e., about 50 percent of the supplied laser beam 6) toward another area of the rear reflective surface 71. Substantially the entire laser beam reflected by the second prism wedge beam splitter 70' is, in turn, reflected by the reflective surface 71 and supplied along or parallel to the optical axis A as beam 28, parallel to the first and the second laser beams 30 and 32. It is to be appreciated that all three beams 28, 30, 32 are substantially collimated, as discussed above, and the first and second beam splitters 68' and 70' and the rear reflective surface 71 merely reflect a desired portion of the supplied laser beam in a collimated fashion along the optical axis A of the laser beam delivery system 2.

It is to be appreciated that in an output angle of each of the emitted laser beams 28, 30 and 32 can be readily altered by varying the base angle of the prism wedge beam splitter 68', 70' or 72' and the entrance angle of the laser beam 6.

The spacing between the separate laser beams 28, 30 and 32 can be easily modified by either varying the angular relationship between the laser beam 6 and the splitter device 69, and/or increasing or decreasing the spacing between the first beam splitter 68, the second beam splitter 70 and/or increasing or decreasing the thickness of the splitter device 69. In addition, as would be readily apparent to one skilled in the art, the quantity of separate laser beams, generated from a single laser beam 6, can be increased or decreased by the varying the quantity of sequentially arranged beam splitters 68, 70 provided along the splitter device 69 and suitably altering the transmissive/reflective characteristics of each of the beam splitters.

For example, as shown in FIG. 23, a third beam splitter 72 with a transmission/reflective surface 67 which lies parallel to but is spaced a small distance from the transmission/reflective surface 65 of the second prism wedge beam splitter 70 may be utilized. The transmission/reflective surface 67 of the third beam splitter 72 is also oriented at an angle of between about 20° to about 80°, preferably about 60°, with respect to the optical axis A of the laser beam delivery system 2. The transmission/reflective surface 67 of the first and second prism wedge beam splitters 68 and 70 are altered so as to allow a smaller percentage of the laser beam, e.g., about 25% and 33.3% of the supplied beam, respectively, to pass to pass therethrough while all of the remaining supplied light is reflected by the respective transmission/reflective surfaces 63, 65 toward the rear reflective surface 71 and is directed at and contacts the transmission/reflective surface 67 of the third beam splitter 72. As the third beam splitter 72 is a 50/50 beam splitter, the third beam splitter 72 will allow about 50 percent of the supplied laser beam 6 to pass therethrough and be supplied along or parallel to the optical axis A as beam 28 and reflect the remaining portion (i.e., about 50 percent of the supplied laser beam 6) toward another area of the rear reflective surface 71. Substantially the entire laser beam reflected by the third beam splitter 72 is, in turn, reflected by the reflective surface 71 and supplied along or parallel to the optical axis A as beam 128, parallel to the first, second and third laser beams 28, 30 and 32. It is to be appreciated that all four laser beams 28, 30, 32 and 128 are substantially collimated, as discussed above, and the first, second and third beam splitters 68', 70' and 72' and the rear reflective surface 69 merely reflect a desired portion of the supplied laser beam in a collimated fashion along the optical axis A of the laser beam delivery system 2.

Figure 25:
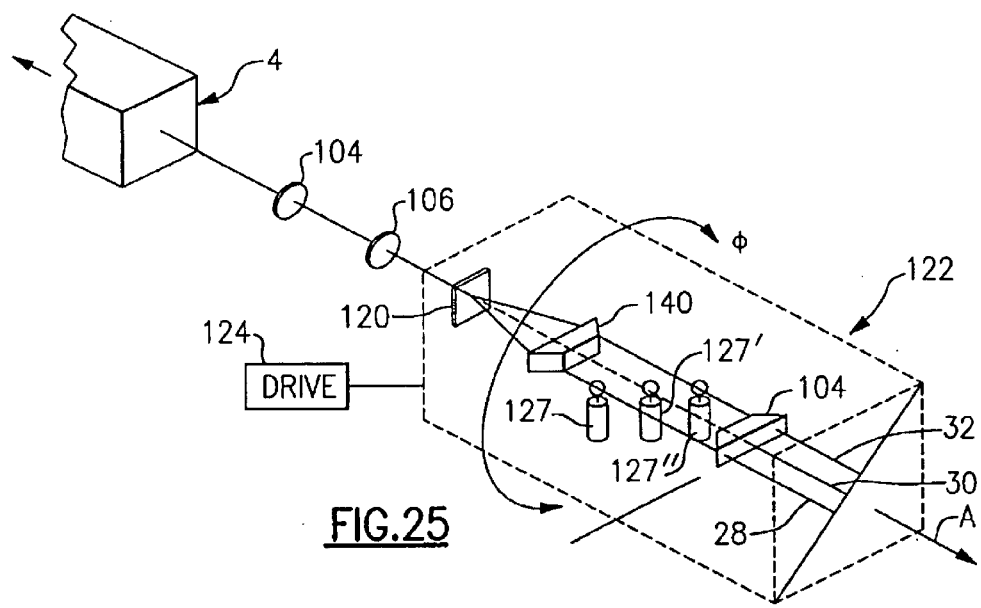
FIG. 25 is a diagrammatic perspective view showing a rotatable splitter module for rotating the beams about the optical axis of the system.
Figure 26:
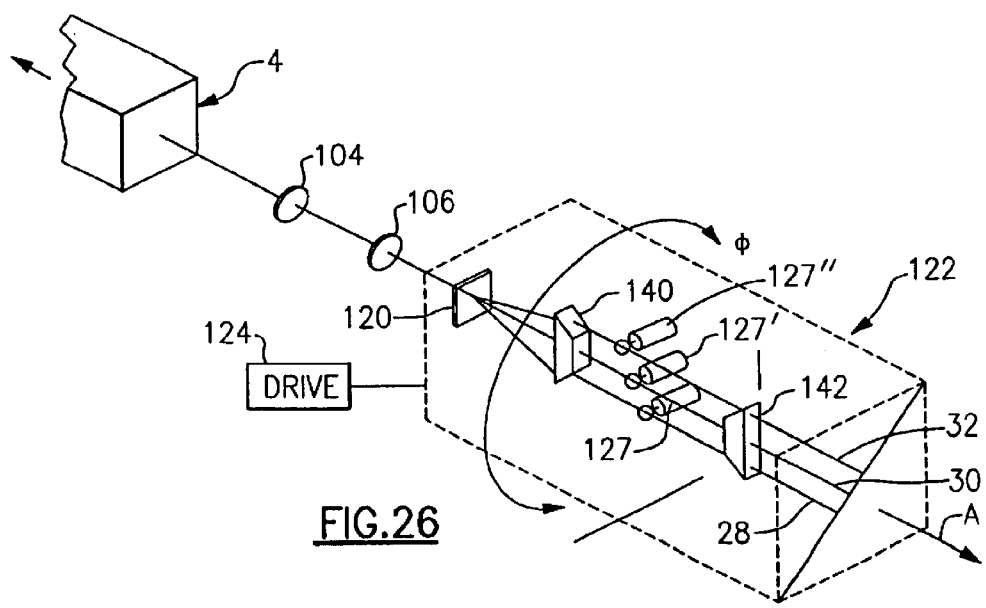
FIG. 26 is a diagrammatic perspective view showing the rotatable splitter module of FIG. 25 following rotation of the beams by 90° relative to the optical axis of the system.

Turning now to FIGS. 25 and 26, a detailed description concerning a rotatable module 122 will now be described. According to this embodiment, as with the previous embodiments, the laser beam 6 is generated by laser 4 and travels through shaping means, such as one or more lenses 104, 106 and possibly one or more computer generated holograms (not shown) where the light is appropriately collimated and/or converted to a desired form depending upon the particular application. The collimated and converted light then enters the rear surface of a final computer generated hologram 120 where the light is shaped and emitted, from a front surface of the final computer generated hologram 120, toward a first of a pair of central illumination prisms 140, 140', i.e., a converging mechanism, as three equally sized and shaped laser beams 28, 30, 32. Each one of the central illumination prisms 140, 140' has a pair of opposed planar surfaces (not numbered) which both extend perpendicular to the optical axis A of the laser beam delivery system 2 and a pair of inclined surfaces (not numbered) which each form an acute angle with the optical axis A of the laser beam delivery system 2. The two central illumination prisms 140, 140' are positioned in an opposed relationship to one another. Three individual shutters 127, 127' and 127" each having an openable and closable door, are positioned between the two central illumination prisms 140, 140'. Each one of the three individual shutters 127, 127' and 127" is located to control one of the three separate beams 28, 30 or 32 so as to either block a respective one of the three separate beams 28, 30 or 32 or allow the same to pass therethrough the respective shutter and be directed at the object to be processed 12.

The second central illumination prism 140' is normally designed to converge the two outer beams 28 and 32, as discussed above, while the central beam 30 is not affected by and remains unaltered by the first and second central illumination prisms 140, 140'. The second central illumination prism 140' is connected to and supported by an adjustment assembly (not shown), connected to a motor drive (not shown), so that the second central illumination prism 140' can be conveyed to and fro along the optical axis A of the laser beam delivery system 2, as necessary, to adjust the relative positions of the three laser beams 28, 30, 32. According to this embodiment, the final computer generated hologram 120, the first and second central illumination prisms 140, 140', and the three individual shutters 127, 127' and 127" and the adjustment assembly are all supported by and housed within the rotatable module 122. A rotational drive 124 (only diagrammatically shown) is connected to the rotatable module 122 to facilitate rotation of the rotatable module 122 relative to the optical axis A in either rotational direction. Due to this arrangement, as the rotatable module 122 is rotated a desired amount, e.g., 90° counterclockwise for example, by the rotatable drive 124 with respect to the optical axis A of the laser beam delivery system 2, the orientation of the three beams 28, 30 and 32, which all initially lie in a horizontal plane as can be seen in FIG. 25, changes to an orientation where all three beams 28, 30 and 32 now lie in a vertical plane, as can be seen in FIG. 26.

Figure 27:
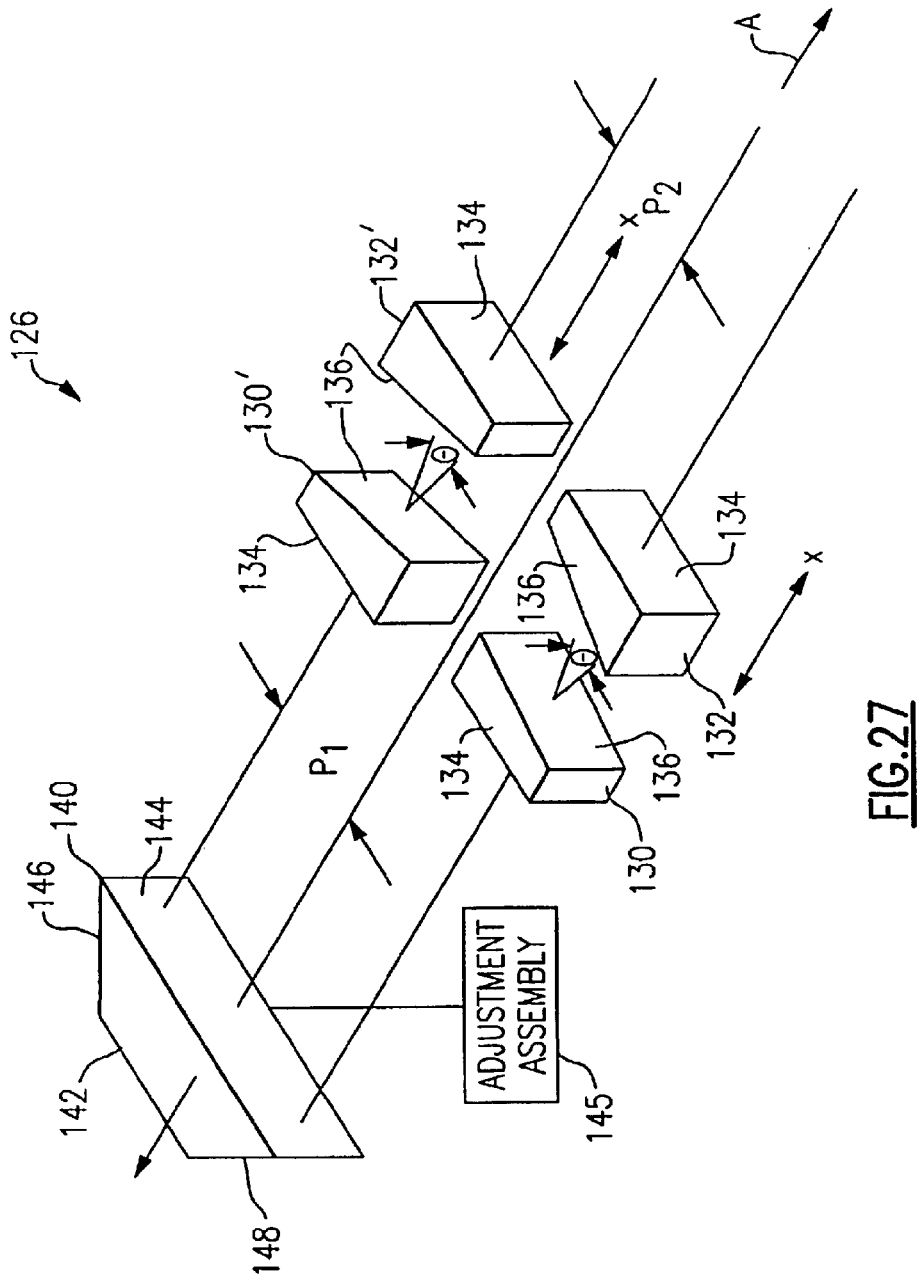
FIG. 27 is a diagrammatic perspective view showing a first embodiment for spacing the outer beams radially further away from the central beam supplied along the optical axis of the system.

Turning now to FIG. 27, a detailed description concerning a beam spreader module 126 will now be described. As with the prior embodiments, a central illumination prism 140 is provided to assist with suitably altering the path of the laser beams 28, 30 and 32. The central illumination prism 40 has a pair of opposed planar surfaces 142, 144, which both extend perpendicular to the optical axis A of the laser beam delivery system 2, and a pair of inclined surfaces 146, 148 which each form an acute angle with the optical axis A of the laser beam delivery system 2. Preferably, the acute angle is between 70° and 99°, most preferably about 89.5°. As with the previous embodiments, the central illumination prism 140 may be supported by an adjustment assembly 145 and connected to a motorized drive (not shown) to facilitate conveying the central illumination prism 140 axially to and fro along the optical axis A of the laser beam delivery system 2 to adjust focusing characteristics of the laser beam delivery system 2.

The central planar surface 142 of the central illumination prism 140, which extends perpendicular to the optical axis A of the laser beam delivery system 2, does not redirect the central beam 30 of the three equally sized and shaped laser beams 28, 30 and 32, and that central planar surface 142 allows that light to pass directly therethrough without substantially affecting the shape, angle and/or path of the central beam 30.

As can be seen in this Figure, the beam separating or spreader module 126 generally comprise first and second pairs of spaced apart prism wedges 130, 130' and 132, 132'. The supplied beams are generated, as discussed above, and supplied by a centrally located prism 140 toward the beam spreader module 126. Each prism wedge 130, 130' and 132, 132', forming the beam spreader module 126, comprises a first surface 134 which is arrange perpendicular to the optical axis A and a second surface 136 which is arranged at an angle θ with respect to the optical axis A, i.e., a line extending perpendicular to the second surface 136 forms an angle θ with the optical axis A. At least the second pair and preferable both the first and second pair of prism wedges 130, 130' and 132, 132' is supported by an adjustment assembly (not shown), connected to a motor drive (not shown), so that at least one pair of the prism wedges 130, 130' and/or 132, 132' can be: 1) conveyed to and fro along the optical axis A of the laser beam delivery system 2, and/or 2) moved closer to or further away from the other cooperating prism wedges 130, 130' or 132, 132' forming the pair of spaced apart prism wedges, as necessary, to adjust the amount or degree of separation of the outer laser beams 28 and 32 relative to the central beam 30—to change the spacing from distance $P_1$ to distance $P_2$. By adequate control of the adjustment assemblies 54 for the prism wedges, the desired degree of divergence of the two outer beams 28, 32, relative to the central beam 30, can be readily controlled.

The first pair of spaced apart prism wedges 130, 130' and 132, 132' are arranged so that the respective outer beam 28 or 30 enters the first surface 134 of the first prism wedge 130 or 130' and exits the second surface 136 of the prism wedge 130 or 130' at an angle θ with respect to the optical axis A, i.e., the first pair of prism wedges 130 or 130' redirect each respective outer beam 28, 32 radially away from the central beam 30 a desired distance (i.e., $P_2-P_1$).

The second pair of spaced apart prism wedges 132, 132' are arranged so that the respective outer beam 28 or 30 enters the second surface 136 of the respective prism wedge at an angle θ with respect to the optical axis A and exits from the first surface 134 the respective prism wedge 132, 132' so that the respective outer beam 28 or 32 is again conveyed or traveling parallel to the optical axis A. That is, the second pair of prism wedges 132, 132' each receive one of the outer beams 28 or 30 and redirects the same parallel to the optical axis A.

Figure 28:
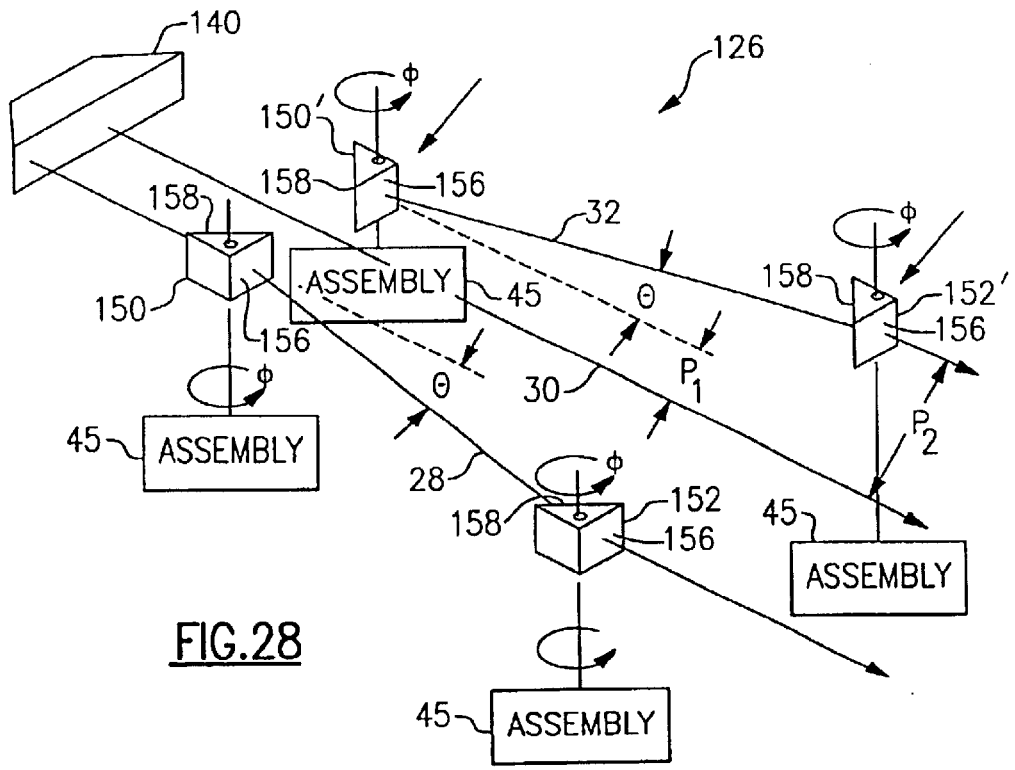
FIG. 28 is a diagrammatic perspective view showing a second embodiment for spacing the outer beams radially further away from the central beam supplied along the optical axis of the system.

Tuning now to FIG. 28, a detail description concerning this further embodiment will now be provided. As this embodiment is very similar to the embodiment of FIG. 27, only the differences between this embodiment and the previous embodiment will be discussed in detail.

As can be seen in this Figure, the beam separating or spreader module 126 generally comprise first and second pairs of spaced apart triangular prism wedges 150, 150' and 152, 152'. The supplied beams 28, 30 and 32 are generated, as discussed above, and supplied by a centrally located prism 140 toward the beam spreader module 126. Each triangular prism wedge 150, 150' and 152, 152', forming the beam spreader module 126, comprises a first surface 156 which is arrange substantially perpendicular to the optical axis A and a second surface 158 which is arranged at an angle θ with respect to the optical axis A, i.e., a line extending perpendicular to the second surface 158 forms an angle θ with the optical axis A. Each triangular prism wedge 150, 150' and 152, 152' is supported by an adjustment assembly 45, connected to a motor drive (not shown), so that each prism wedge can be at least one of: 1) conveyed to and fro along the optical axis A of the laser beam delivery system 2, 2) rotated about a rotational axis of the triangular prism wedge, and/or 3) moved closer to or further away from the other cooperating triangular prism wedge, as necessary, to adjust the amount or degree of separation of the outer laser beams 28 and 32 relative to the central beam 30. By adequate control of the adjustment assembly 45 for each triangular prism wedge, the desired degree of convergence or divergence of the two outer beams 28, 32, relative to the central beam 30, can be readily controlled.

The first pair of spaced apart triangular prism wedges 150, 150' are arranged so that the respective outer beam 28 or 30 enters the second surface 158 the prism wedge and exits the first surface 156 of the prism wedge 150, 150' at an angle θ with respect to the optical axis A, i.e., the first pair of prism wedges 150, 150' redirects the respective outer beam 28, 32 radially away from the optical axis A.

The second pair of spaced apart prism wedges 152, 152' are arranged so that the respective outer beam 28 or 30 enters the second surface 158 of the triangular prism wedge at an angle θ with respect to the optical axis A and exits from the first surface 156 of the respective prism wedge so that the respective outer beam 28 or 32 is again conveyed or traveling parallel to the optical axis A but spaced further away therefrom. That is, the second pair of prism wedges 152, 152' each receive one of the outer beams 28 or 30 and redirects the same parallel to the optical axis A.

Figure 29:
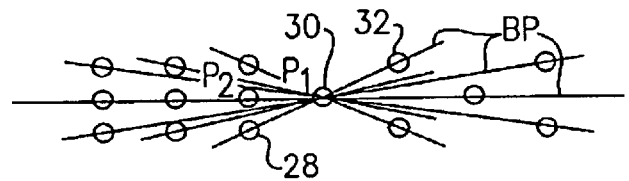
FIG. 29 is a diagrammatic view showing a variety of possible beam arrangements.

It is to be appreciated that the beam separating or spreader module 126, for spacing or separating the outer beams 28 and 32 radially with respect to the central beam 30, may be combined with the rotatable module 122 to vary also the position, spacing and/or orientation of the outer beams 28 and 32 relative to the central beam 30. A variety of possible beam arrangements, which are readily achievable by the teaching of the present invention, are shown in FIG. 29. It is to be appreciated that each set of three laser beams will all lie in a single plane BP but the relative spacing from one another and/or horizontal/vertical relationship can be varied depending upon the particular application.

Figure 30:
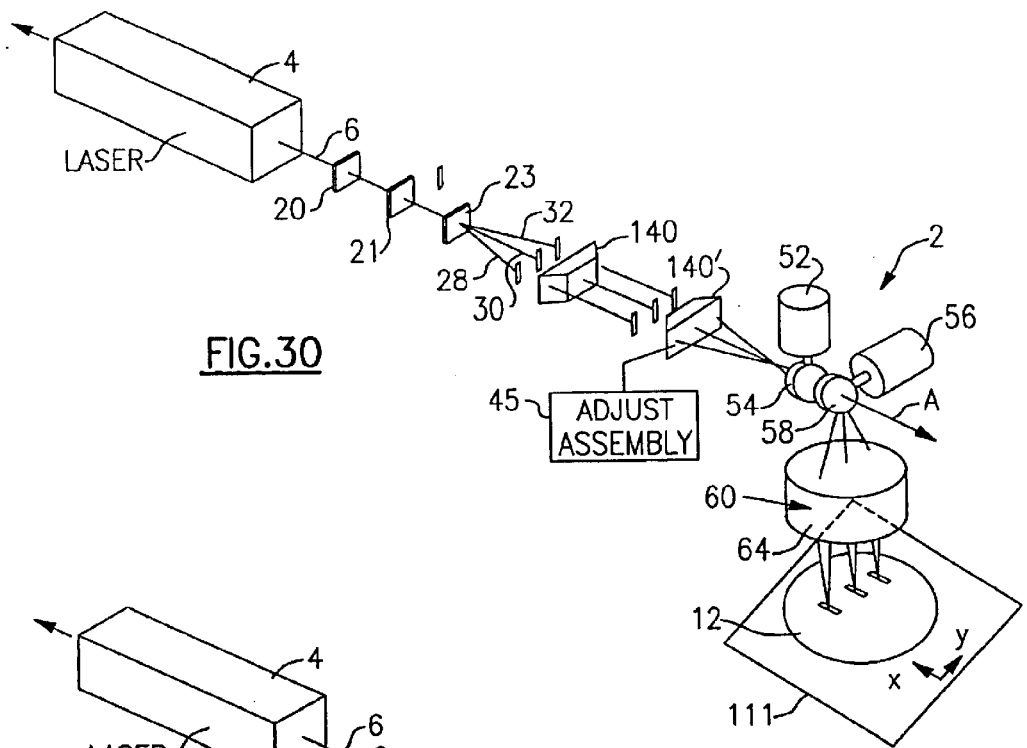
FIG. 30 is a diagrammatic perspective view showing an embodiment for shaping the beams to form a rectangular aperture in a surface.

Turning now to FIG. 30, a detailed description concerning a further embodiment, according to the present invention, will now be described. According to this embodiment, the laser beam 6 is generated by a laser 4 and travels through a first computer generated hologram 20 where the light is converged or collimated. The converged or collimated light exits from the front surface of the first computer generated hologram 20 and is supplied to a rear surface of a second computer generated hologram 21. The second computer generated hologram 21 converges or converts the converging or collimated light from a gaussian profile to a line image profile and emits the line image profile from a front surface thereof as a substantially flat top beam or a desired wave front. The light having a line image profile then enters the rear surface of a third computer generated hologram 23 where the light is split and emitted, from a front surface of the third computer generated hologram 23, toward a first of a pair of illumination prisms 140, 140', i.e., a converging mechanism, as three equally sized and shaped line image profile laser beams 28, 30, 32. Each one of the illumination prisms 140, 140' has a pair of opposed planar surfaces which both extend perpendicular to the optical axis A of the laser beam delivery system 2 and a pair of inclined surfaces which each form an acute angle with the optical axis A of the laser beam delivery system 2. The two illumination prisms 140, 140' are positioned in an opposed relationship to one another. A shutter (not shown) having a plurality of openable and closable doors is positioned between the two illumination prisms 140, 140' to control the number of separate beams 28, 30 or 32 that are allowed to pass through the shutter or shutters and be directed at the object to be processed 12 after passing through the second illumination prism 140'.

The second illumination prism 140' converges the two outer beams so that the illumination path of each of the outer beams 28, 32, having a line image profile, passes solely through the clear aperture of the mirror 54 of the first repeat positioner 52, while the central beam 30 is not affected by and remains unaltered by the first and second illumination prisms 140, 140'. The second illumination prism 140' is connected to and supported by an adjustment assembly 45, connected to a motor drive (not shown), so that the second illumination prism 140' can be conveyed to and fro along the optical axis A of the laser beam delivery system 2, as necessary, to adjust the degree of overlap of the three equally sized and shaped collimated linear laser beams 28, 30, 32. By adequate control of the second illumination prism 140', the desired convergence of the two outer beams 28, 32, so that they sufficiently overlap the central beam 30, can be achieved so that all three beams 28, 30, 32 pass solely to the clear aperture of mirror 54 of the first repeat positioned 52.

Once all three beams contact and reflect off the first mirror 54, all three beams 28, 30, 32 begin to re-expand to a specific pitch and spacing from one another prior reflecting off the second mirror 58 controlled by the second repeat positioner 56 and striking an F-Theta lens 60. The expanded three beams 28, 30 and 32 are each then altered, via the inherent optical characteristics of the F-Theta lens 60 in a conventional manner. Finally, the altered light is then emitted from a front surface 64, of the F-Theta lens 60, toward the object to be processed 12 for forming three equivalent but equally rectangular shaped apertures, in the object.

It is to be appreciated that if the table 111 supporting the object to be processed 12 is moved in either the X or Y directions or the repeat positioners 52, 56 are appropriately moved in either the X or Y directions, while the three beams 28, 30 and 32 are continuously forming the three equivalent apertures in the object, the system can be used to facilitate laser dicing or cutting of the object to be processed 12. Once a desired amount of dicing or cuts is formed in the object in one cut direction, the table 111 is then rotated 90° where a further desired amount of dicing or cuts may be formed in the object in a second direction extending normal to the first direction.

Figure 31:
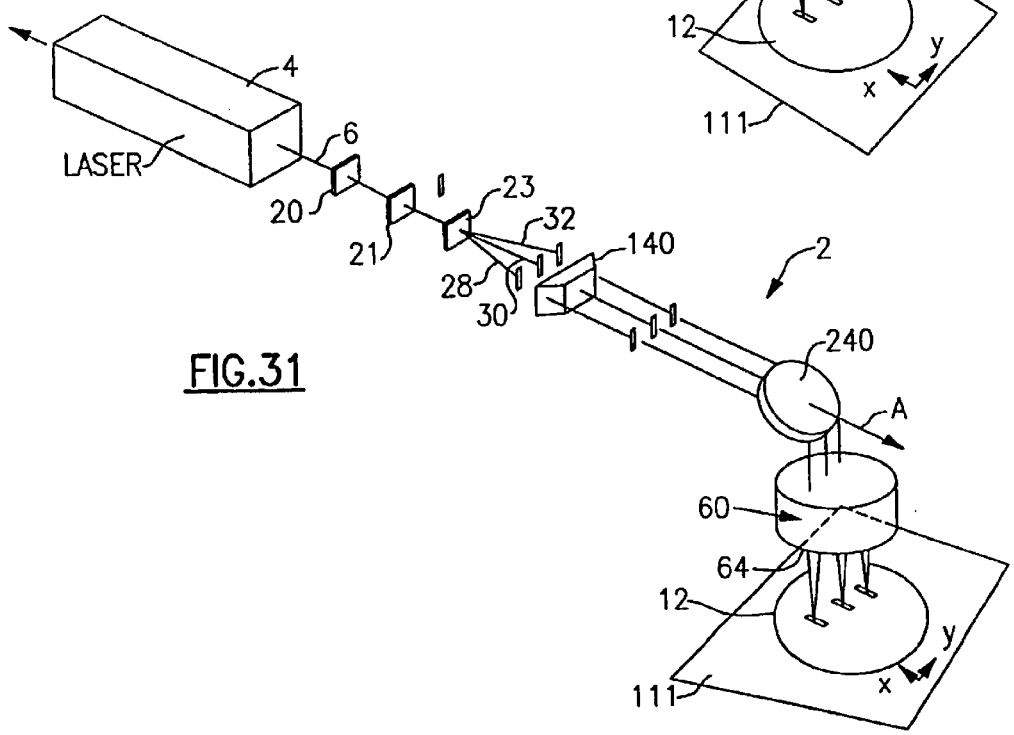
FIG. 31 is a diagrammatic perspective view showing a second embodiment for shaping the beams to form rectangular aperture in a surface.

Turning now to FIG. 31 a brief discussion concerning a variation of the embodiment of FIG. 30 will now be discussed. In this embodiment, identical elements are provided with the identical reference numerals and a further detailed description concerning such elements is not provided.

The major difference between this embodiment and the previous embodiment is the replacement of the F-Theta lens with an imaging lens and the elimination of the second illumination prism 140' and the first and second repeat positioners 52, 56 in favor of a single reflective mirror 240. Due to this arrangement, as the laser beams 28, 30 and 32 pass through the shutter (not shown) all three beams are traveling parallel to one another and do not converge toward one another. Accordingly, all three beams are transmitted parallel to one another and strike the mirror 240 which reflects and redirects the three beams 28, 30 and 32 toward an imaging lens 60. The three beams 28, 30 and 32 are each then altered, via the inherent optical characteristics of the imaging lens 60 in a conventional manner. Finally, the altered light is then emitted from a front surface 64, of the imaging lens 60, toward the object to be processed 12 for forming three equivalent but equally rectangular shaped apertures, in the object.

It is to be appreciated that if the table 111 supporting the object to be processed 12 is moved in either the X or Y directions, while the three beams 28, 30 and 32 are continuously forming the three equivalent apertures in the object, the system can be used to facilitate laser dicing or cutting of the object to be processed 12 as discussed above.

The beam delivery system 2 may be utilized for drilling multi-layered materials, 3D structuring of MEMS, Stereolithography, link blowing for memory or IC repair of fabrication, mask repair or to assist with laser cleaning of a litho mask. Alternatively, the beam delivery system 2 may be utilized for exposure of a photosensitive material or for direct laser imaging. According to a preferred form of the invention, all movement of the individual components, such as the shutters, the doors, the galvometers, etc., in the X, Y and Z directions are achieved via an interpolated motion.

Since certain changes may be made in the above described improved laser beam delivery system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A laser beam delivery system comprising:
 a laser source for outputting a laser beam;
 a shaping apparatus for receiving the laser beam output by the laser and for shaping the laser beam into a plurality of separate laser beams;
 a converging mechanism for redirecting the plurality of separate laser beams through a clear aperture of a mirror of a repeat positioning device;
 the repeat positioning device redirecting the plurality of separate laser beams to an F-Theta lens;
 the converging mechanism being movable relative to the repeat positioning device for adjusting a degree of convergence of the plurality of separate laser beams to facilitate passage of each one of the plurality of separate laser beams pass through the clear aperture of the mirror of the repeat positioning device; and
 the F-Theta lens focusing the plurality of separate laser beams at an object to be processed.

2. The laser beam delivery system according to claim 1, wherein the shaping apparatus comprises a computer generated hologram and the computer generated hologram splits the light laser beam at an image plane into at least three separate laser beams.

3. The laser beam delivery system according to claim 2, wherein collimated optics are located adjacent to the imaging plane for collimating the three separate laser beams generated by the computer generated hologram so that the three separate laser beams are supplied parallel to one another and along an optical axis of the laser beam delivery system.

4. The laser beam delivery system according to claim 3, wherein an illumination prism is located between the collimated optics and the mirror of the repeat positioning device so that the three separate laser beams converge toward one another as the three separate laser beams approaching the repeat positioning device so that all of the generated light passes through a clear aperture of the repeat positioning device.

5. The laser beam delivery system according to claim 2, wherein the laser beam has a gaussian profile and the computer generated hologram converts the laser beam of the guassian profile into three separate beams each having a substantially flat top portion profile.

6. The laser beam delivery system according to claim 2, wherein a pair of prisms facilitates convergence of two of the three separate laser beams toward a central beam so that the three separate laser beams pass through a clear aperture of the repeat positioning device, and the pair of prisms is movable to and fro along the optical axis to facilitate adjustment of a degree of convergence of the plurality of separate laser beams.

7. The laser beam delivery system according to claim 6, wherein the pair of prisms is also rotatable about a rotation axis to facilitate adjustment of the degree of convergence of the plurality of separate laser beams.

8. The laser beam delivery system according to claim 2, wherein a pair of deflective mirrors facilitates convergence of two of the three separate laser beams toward a central beam so that the three separate laser beams pass through a clear aperture of a first mirror of the repeat positioning device, and the pair of deflective mirrors is movable to and fro along the optical axis to facilitate adjustment of a degree of convergence of the plurality of separate laser beams.

9. The laser beam delivery system according to claim 1, wherein the laser beam delivery system has two repeat positioning devices and the F-Theta lens is located between the two repeat positioning devices and the object to be processed, and the F-Theta lens is positioned a sufficient distance from the object to be processed so that the laser beam of each of the plurality of separate laser beams is focused prior to contacting the object to be processed.

10. The laser beam delivery system according to claim 1, wherein the laser beam delivery system has two repeat positioning devices and the F-Theta lens is located between the two repeat positioning devices and the object to be processed, and the object to be processed is positioned at a focal plane of the F-Theta lens.

11. The laser beam delivery system according to claim 1, wherein the laser is directed at a series of beam splitters, and the series of partially reflected beam splitters reflect a portion of the supplied laser beam parallel to the optical axis of the laser beam delivery system while allowing a remaining portion of the supplied laser beam to pass therethrough.

12. The laser beam delivery system according to claim 1, wherein the laser beam is supplied to a beam splitter device and the beam splitter device splits the supplied laser beam into at least three separate laser beams which are supplied parallel to the optical axis of the delivery system beam, and the beam splitter device has partially reflective surfaces, which allow a portion of the laser beam to pass therethrough and reflect a remaining portion of the supplied laser beam.

13. The laser beam delivery system according to claim 1, wherein a hologram, first and second illumination prisms and three individual shutters are all supported by and housed within a rotatable module, and a rotational drive is connected to the rotatable module to facilitate rotation of the rotatable module relative to the optical axis.

14. The laser beam delivery system according to claim 1, wherein the laser beam delivery system has a spreader module, for spacing two outer beams radially with respect to a central beam, and an adjustment mechanism facilitates spacing of the first pair of prisms from the second pair of prisms to control spacing of the two outer beams relative to the central beam.

15. The laser beam delivery system according to claim 14, wherein the adjustment mechanism also includes a rotation mechanism to rotate each prism about a rotational axis thereof and assist with controlling spacing of the two outer beams relative to the central beam.

16. The laser beam delivery system according to claim 1, wherein the laser beam delivery system has a spreader module, for spacing two outer beams radially with respect to a central beam, and an adjustment mechanism facilitates spacing of the first pair of prisms from the second pair of prisms to control an amount of spacing of the two outer beams relative to the central beam, and the spreader module and the adjustment mechanism are housed within a rotatable module, and a rotational drive is connected to the rotatable module to facilitate rotation of the rotatable module relative to the optical axis.

17. The laser beam delivery system according to claim 1, wherein the laser beam delivery system has a trepanning module positioned between the converging mechanism and the repeat positioning device, the trepanning module comprises first and second spaced apart sequentially arranged rotating wedge prisms which are aligned along and are concentric with the optical axis of the laser beam delivery system.

18. A laser beam delivery system comprising:
a laser source for outputting a laser beam;
a shaping apparatus for receiving the laser beam output by the laser and for shaping the laser beam into a plurality of separate laser beams;
a converging mechanism for redirecting the plurality of separate laser beams through a clear aperture of a mirror of a repeat positioning device;
the repeat positioning device redirecting the plurality of separate laser beams to an F-Theta lens;
the F-Theta lens focusing the plurality of separate laser beams at an object to be processed; and
the converging mechanism comprises an illumination prism connected to a drive and the drive facilitates conveyance of the illumination prism to and fro along the optical axis to facilitate adjustment of a degree of convergence of the plurality of separate laser beams through the clear aperture of the mirror of the repeat positioning device and facilitate reexpansion of the plurality of separate laser beams.

19. The laser beam delivery system according to claim 18, wherein the illumination prism has a pair of opposed planar surfaces which extend normal to the longitudinal axis of the laser beam delivery system and a pair of inclined surfaces which extend at an acute angle with respect to the optical axis of the system to facilitate converging of the laser beams through the clear aperture of the mirror of the repeat positioning device.

20. A laser beam delivery system comprising:
a laser source for outputting a laser beam;
a shaping apparatus for receiving the laser beam output by the laser and for shaping the laser beam into a plurality of separate laser beams;
a converging mechanism for redirecting at least one of the plurality of separate laser beams through clear apertures of a pair of mirrors of a repeat positioning device;
the pair of mirrors of the repeat positioning device facilitating reexpansion of the plurality of separate laser beams and redirecting the plurality of separate laser beams toward an F-Theta lens;

the converging mechanism being movable relative to the pair of mirrors of the repeat positioning device for adjusting a degree of convergence of the plurality of separate laser beams to facilitate passage of each one of the plurality of separate laser beams pass through the clear aperture of the mirror of the repeat positioning device and facilitate reexpansion of the plurality of separate laser beams; and the F-Theta lens focusing the plurality of separate laser beams at an object to be processed.

* * * * *